US011680598B2

(12) United States Patent
Liversidge et al.

(10) Patent No.: US 11,680,598 B2
(45) Date of Patent: Jun. 20, 2023

(54) FIXING DEVICE

(71) Applicant: TAVISMANOR LIMITED, Colchester (GB)

(72) Inventors: Barry Peter Liversidge, Colchester (GB); George Henri Liversidge, Colchester (GB)

(73) Assignee: TAVISMANOR LIMITED, Colchester (GB)

( * ) Notice: Subject to any disclaimer, the term of this patent is extended or adjusted under 35 U.S.C. 154(b) by 719 days.

(21) Appl. No.: 16/611,734

(22) PCT Filed: May 8, 2018

(86) PCT No.: PCT/GB2018/051229

§ 371 (c)(1),
(2) Date: Nov. 7, 2019

(87) PCT Pub. No.: WO2018/206933

PCT Pub. Date: Nov. 15, 2018

(65) Prior Publication Data

US 2020/0109733 A1 Apr. 9, 2020

(30) Foreign Application Priority Data

May 8, 2017 (GB) ..................................... 1707369

(51) Int. Cl.
*F16B 13/04* (2006.01)
*F16B 13/06* (2006.01)
*F16B 13/08* (2006.01)

(52) U.S. Cl.
CPC ........ *F16B 13/061* (2013.01); *F16B 13/0808* (2013.01)

(58) Field of Classification Search
CPC ........................... F16B 13/0808; F16B 13/061
(Continued)

(56) References Cited

U.S. PATENT DOCUMENTS 2,017,421 A * 10/1935 Post ....................... F16B 37/067 29/512
2,018,251 A * 10/1935 Croessant ............. F16B 13/061 411/37

(Continued)

FOREIGN PATENT DOCUMENTS

DE 20010997 U1 10/2000
EP 0246028 A1 11/1987

(Continued)

OTHER PUBLICATIONS

International Search Report and Written Opinion from PCT/GB2018/051229; 18 pages; Tuija Ikonen; dated Sep. 5, 2018.

(Continued)

*Primary Examiner* — Gary W Estremsky
(74) *Attorney, Agent, or Firm* — Dicke, Billig & Czaja, PLLC

(57) ABSTRACT

This invention relates to a fixing device for holding a fastener in a hole in a structure comprising an actuating part configured to engage with said fastener in use and a plurality of arms extending from and hingedly connected to the actuating part, each arm comprising a distal portion and an anchor portion between the distal portion and the actuating part. The arms are an insertion configuration formed or formable by moving the arms from an initial configuration in which the arms are splayed to the insertion configuration in which the arms are substantially aligned so that the distal portions define an axial passage and, in use, the fastener extends through the axial passage to engage with the actuating part, and cooperation of the fastener with the actuating part moves the actuating part in an axial direction towards the distal portions to cause a part of each of the anchor portions to move in a radially outward direction with respect to the axial passage to anchor the fixing device in said hole.

18 Claims, 13 Drawing Sheets

(58) Field of Classification Search
USPC ....... 411/108, 111, 112, 55, 57.1, 60.2, 60.3, 411/61, 63, 80.6, 21, 33, 34, 38, 37
See application file for complete search history.

(56) References Cited

U.S. PATENT DOCUMENTS

| | | | | |
|---|---|---|---|---|
| 2,396,501 | A * | 3/1946 | Gibson | F16B 13/061 411/38 |
| 3,143,916 | A | 8/1964 | Rice | |
| 3,363,501 | A | 1/1968 | Modrey | |
| 4,752,170 | A | 6/1988 | McSherry et al. | |
| 4,920,618 | A * | 5/1990 | Iguchi | F16B 13/061 24/297 |
| 5,378,097 | A | 1/1995 | Barnavol | |
| 5,725,341 | A | 3/1998 | Hofmeister | |
| 6,746,191 | B2 * | 6/2004 | Edland | F16B 13/0808 411/45 |
| 8,707,657 | B2 * | 4/2014 | Axelsson | F16B 13/0833 411/39 |
| 9,188,142 | B2 * | 11/2015 | Vullings | F16B 13/0808 |
| 9,453,524 | B2 * | 9/2016 | Sisto | F16B 13/0808 |
| 2004/0131442 | A1 * | 7/2004 | Dieckmann | F16B 37/044 411/112 |
| 2006/0182511 | A1 * | 8/2006 | Dessureau | F16B 5/0275 411/38 |
| 2007/0264099 | A1 * | 11/2007 | Huang | F16B 13/061 411/38 |
| 2011/0081219 | A1 * | 4/2011 | Chen | F16B 13/0808 411/395 |
| 2012/0257944 | A1 * | 10/2012 | McDuff | F16B 13/061 411/21 |

FOREIGN PATENT DOCUMENTS

| | | | |
|---|---|---|---|
| GB | 1514044 | A | 6/1978 |
| GB | 2191838 | A | 12/1987 |
| WO | 92/07196 | A1 | 4/1992 |

OTHER PUBLICATIONS

International Preliminary Report on Patentability from PCT/GB2018/051229; 22 pages; Anne Dorpema; dated Apr. 11, 2019.
Search Report from GB1707369.3; 1 page; Peter Macey; dated May 23, 2017.

* cited by examiner

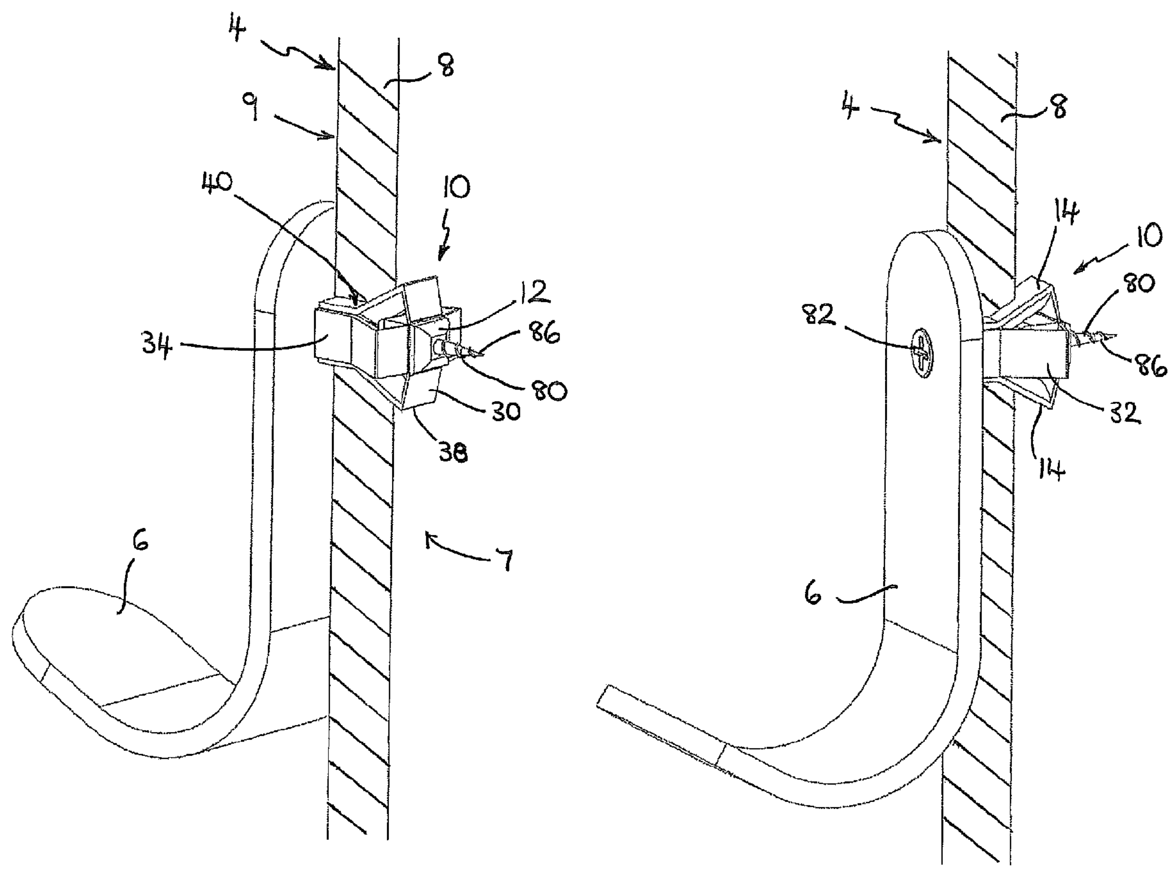
Fig. 14
Fig. 15
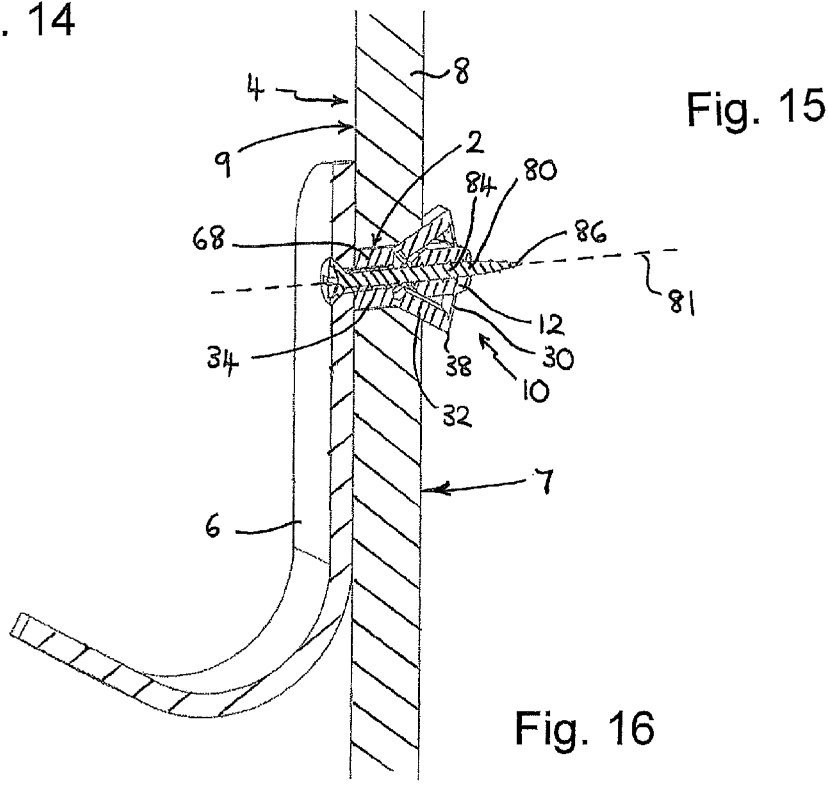
Fig. 16

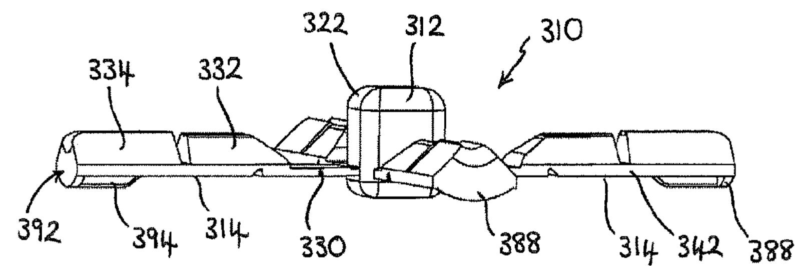
Fig. 25
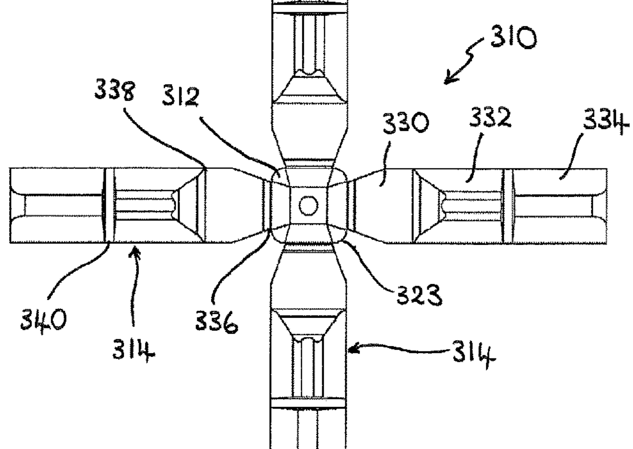
Fig. 26
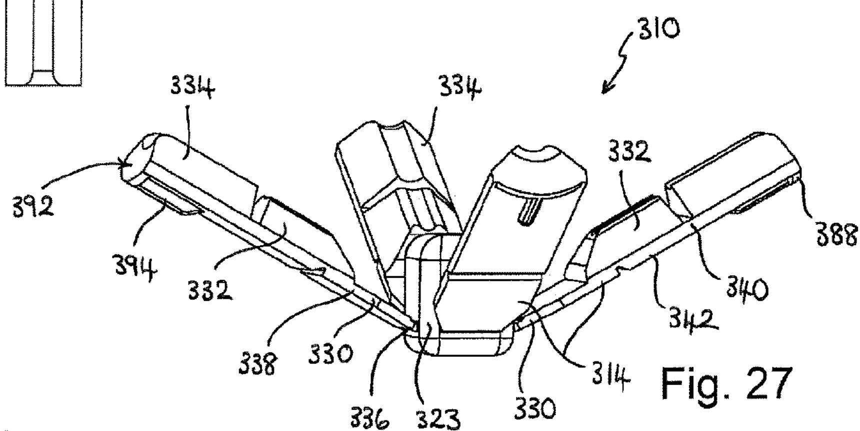
Fig. 27
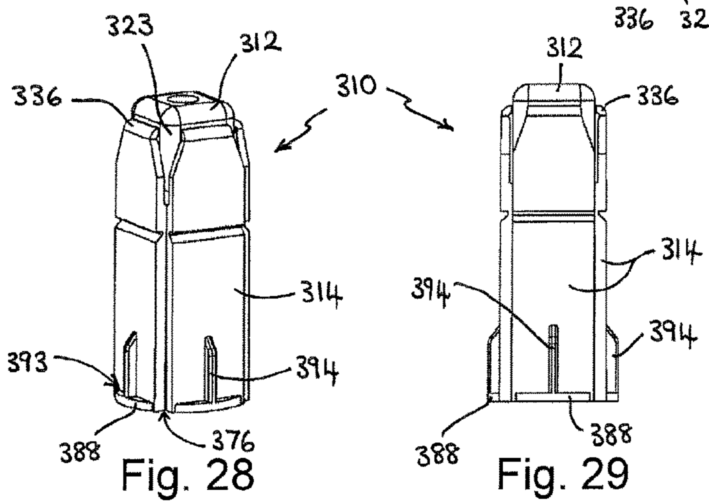
Fig. 28
Fig. 29
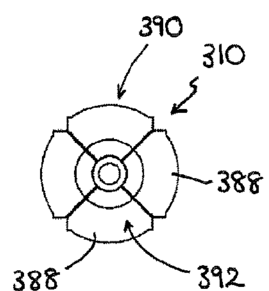
Fig. 30

FIXING DEVICE

BACKGROUND

This invention relates to a fixing device for holding a fastener in a hole in a structure. In particular, this invention relates to fixing devices into which a fastener, such as a screw or bolt, may be inserted to attach or secure an object to a structure such as a wall, ceiling or floor.

During construction of buildings, and in everyday situations, fasteners such as screws are used to attach or secure objects, such as lighting, shelves or pictures, to a wall. The fasteners typically bear the weight of the object and any other loads applied to the object. The fastener transfers the load to the wall, or other structure in which it is disposed, and, accordingly, the fastener must be securely anchored in the wall.

In some walls, such as those made of plasterboard, it is often necessary to use a wall fixing to secure the fastener in a hole in the wall and to spread the load applied to the wall by the fastener.

A large number of different types of wall fixings are known in the art. In general, the wall fixings function in broadly the same manner. A hole is formed in a wall or other structure to receive the wall fixing. The wall fixing is inserted into the hole in a non-deformed or initial configuration. A fastener, such as a screw or bolt, which is connected to an object to be secured to the wall or structure is then inserted into the wall fixing. The screw or bolt engages with the wall fixing and causes the wall fixing to exert a gripping or compressive force on the surrounding wall which secures the object to the wall.

A variety of different wall fixings are known that apply the gripping force in different ways. In one type of wall fixing, the insertion of the fastener causes the wall fixing to expand radially outwards and grip the sides of the hole in which the wall fixing is disposed. Typically these types of fixings are best suited for use in walls which comprise relatively solid materials such as stone, concrete or brickwork. A disadvantage of this type of expanding wall fixing when used in plasterboard is that because the wall fixing expands radially outwardly a relatively small amount it cannot sufficiently disperse a load applied to the fixing into the gypsum material from which plasterboard is made and therefore can only apply a limited gripping force to the wall. These fixings are, therefore, typically used to secure smaller objects or loads to a wall. These wall fixings are, however, relative cheap to manufacture and are typically made of a moulded polymeric material. One example of this type of wall fixing is a rawlplug (RTM).

Several types of prior art wall fixings are manufactured by moulding a suitable plastics material around a core pin, such that the core pin forms the contours of a bore or axial passage within the wall fixing. The bore or axial passage is typically configured to receive at least a part of a fastener, such as a screw, which is used to secure an object to the wall in which the wall fixing is disposed. The use of a core pin, however, restricts the internal shape and configuration of the axial passage because the core pin must be retracted from the axial passage of the wall fixing after the moulding process is completed. Accordingly, because of the draft angles required to extract the core pin, it is difficult or impossible to provide some arrangements within the axial passage of the fixing device, for example up-stands or protuberances.

Another type of wall fixing comprises a plate or arm that locates on a rear side of a wall through which the wall fixing is inserted, or behind a sheet material such as plasterboard.

In use, these wall fixings apply a clamping force to the opposite front and rear faces of the wall or plasterboard between a front plate or flange of the wall fixing and the rear plate or arm. The disadvantage of this type of wall fixing is that a cavity or space is required behind the wall or plasterboard, and the cavity must also be sufficient to accommodate the rear plate or arm. Furthermore, these fixings are often more complex and more expensive to manufacture. The advantage of these wall fixings, however, is that they are able to support heavy loads and these wall fixings are, therefore, typically used to secure larger and heavier objects to a wall.

It is an object of the present invention to provide an improved fixing device that overcomes at least one of the disadvantages of prior art wall fixings, whether referred to herein or otherwise.

SUMMARY OF THE INVENTION

A first aspect of the present invention provides a fixing device for holding a fastener in a hole in a structure, the device comprising:

- an actuating part configured to engage with said fastener in use; and
- a plurality of arms extending from and hingedly connected to the actuating part, each arm comprising a distal portion, a connecting portion and an anchor portion, the connecting portion extending between the actuating part and the anchor portion and being hingedly connected to the anchor portion, and the anchor portion extending between the distal portion and the connecting portion and being hingedly connected to the distal portion,
- the arms being in an insertion configuration formed or formable by moving the arms from an initial configuration in which the arms are splayed to the insertion configuration in which the arms are substantially aligned so that the distal portions define an axial passage, and
- wherein, in use, the fastener extends through the axial passage to engage with the actuating part, and cooperation of the fastener with the actuating part moves the actuating part in an axial direction towards the distal portions to cause a part of each of the anchor portions to move in a radially outward direction with respect to the axial passage into an expanded configuration to anchor the fixing device in said hole, and in the expanded configuration at least a part of the actuating part is disposed between the anchor portions of the arms to resist or prevent radially inward movement of the anchor portions.

The term splayed means that each of the arms extends in a direction which is not aligned to an axis of the fixing device.

In preferred embodiments the actuating part comprises a bore for receiving a part of said fastener. The bore may be threaded. Preferably the bore extends axially through the actuating part. In some embodiments the threaded bore may be provided by a captive nut in the actuating part.

The actuating part may comprise a plurality of side walls, the number of side walls equaling the number of arms. In these embodiments, each of the plurality of arms preferably extends from a respective one of the plurality of side walls.

In a preferred embodiment the fixing device has four arms; however, the fixing device may two arms, three arms, or more than four arms.

Preferably movement of the actuating part in the axial direction towards the distal portions causes a proximal end of each of the anchor portions to move in a radially outward direction.

In some embodiments the actuating part comprises a contact surface and the anchor portion of each arm includes a sloped bearing surface, the contact surface contacting the bearing surface during axial movement of the actuating part to cause radially outwards movement of a part of the anchor portion. The contact surface may be a ramp surface.

The sloped bearing surface may comprise a cam surface. The cam surface may comprise a first (initial) section, a nose (middle) section and a second (final) section. Preferably the contact surface is arranged to contact the bearing surface and move from the first section, over the nose section and to the second section. Preferably the cam surface creates a resistive force against the movement of the actuating part as the actuating part moves over the first section, nose section and second section. Preferably the resistive force increases up until the actuating part moves over the nose section and the resistive force then decreases. Preferably the fixing device defines a seat which is arranged to receive a part of the actuating part in the expanded (final) position. The distal portions of the arms may comprises a contact (or abutment) surface which may form the seat. The distal portions of the arms may comprises a contact (or abutment) surface which may form a contiguous annular surface to define the seat.

In the initial configuration, each of the arms may extend from the actuating part in a direction substantially perpendicular to an axis of the fixing device. In the insertion configuration, adjacent arms may be in contact with each other. In some embodiments distal portions of adjacent arms may be bonded or welded to each other in the insertion configuration. In other embodiments distal portions of adjacent arms may be mechanically interlocked in the insertion configuration.

In preferred embodiments each arm comprises a stem portion extending along the full length of the arm and a prominence extending from a first side of the stem portion in the distal portion of the arm, each prominence having an axial passage surface and the axial passage surfaces surrounding and defining the axial passage when the arms are in the insertion configuration. A second prominence may extend from the first side of the stem portion in the anchor portion of the arm. Each second prominence preferably has a guide surface; the guide surfaces surrounding and defining a guide passage when the arms are in the insertion configuration. Preferably the guide passage is aligned with the axial passage. In embodiments in which the actuating part includes a bore, the guide passage and axial passage are preferably aligned with the bore. A diameter of each of the guide passage and axial passage is preferably greater than a diameter of the bore.

In some embodiments a flange member extends from the distal portion of each arm. The flange members form a radially outwardly extending flange when the arms are in the insertion configuration.

The fixing device is a unitary object. Preferably the fixing device is a single piece moulding.

In preferred embodiments the fixing device is made of a rigid or semi-rigid polymeric material, which is preferably a thermoplastic polymeric material. In these embodiments each arm is preferably hingedly connected to the actuating part by a live hinge. In some embodiments each anchor portion is hingedly connected to the respective connecting portion by a hinge portion in the form of a live hinge. Furthermore, each distal portion is preferably hingedly connected to the respective anchor portion by a hinge portion in the form of a live hinge.

A second aspect of the present invention provides, in combination, a fixing device according to the first aspect of the invention and a fastener received through the axial passage and engaged with the actuating part.

The fastener is preferably a threaded fastener. The fastener may be a screw. In some embodiments the actuating part comprises a captive nut and the fastener is a bolt.

In preferred embodiments an axis of the fastener is parallel with an axis of the fixing device.

The following description also discloses a method of forming a fixing device for holding a fastener in a hole in a structure, the fixing device comprising an actuating part and a plurality of arms extending from the actuating part, and the method comprising:

providing the fixing device in an initial configuration in which the arms are splayed; and moving the arms to an insertion configuration in which the arms are substantially aligned so that distal portions of the arms surround and define an axial passage, the axial passage being configured to receive said fastener therethrough to allow the fastener to engage with the actuating part in use.

The method may further comprise, after moving the arms to the insertion configuration, bonding or welding adjacent distal portions. In other examples the method comprises after moving the arms to the insertion configuration, mechanically interlocking adjacent distal portions.

Preferably, moving the arms to an insertion configuration comprises folding each arm about a live hinge between the arm and the actuating part.

The adjacent arms may be in contact in the insertion configuration. In some examples, in the initial configuration each of the arms extends from the actuating part in a direction substantially perpendicular to an axis of the fixing device and in the insertion configuration each of the arms extends from the actuating part in a direction substantially parallel to an axis of the fixing device.

A third aspect of the present invention provides a method for holding a fastener in a hole in a structure, the method comprising:

inserting a fixing device in the hole, the fixing device being in an insertion configuration in which a plurality of substantially aligned arms extend from an actuating part, each arm comprising a distal portion, a connecting portion and an anchor portion, the connecting portion extending between the actuating part and the anchor portion and being hingedly connected to the anchor portion, and the anchor portion extending between the distal portion and the connecting portion and being hingedly connected to the distal portion;

inserting a fastener through an axial passage defined by the distal portions of the arms;

engaging the fastener with the actuating part; and moving the actuating part, by cooperation of the fastener with the actuating part, in a direction towards the distal portions to cause the anchor portion of each arm to move in a radially outward direction with respect to the axial passage into an expanded configuration to anchor the fixing device in the hole until at least a part of the actuating part is disposed between the anchor portions of the arms to resist or prevent radially inward movement of the anchor portions, wherein, the insertion configuration is formed or formable by moving the arms from an initial configuration in which the arms are splayed to the insertion configuration in which the arms are substantially aligned so that fixing device can be inserted in the hole and the distal portions define the axial passage.

In preferred embodiments the fastener is a threaded fastener and the fastener is engaged with the actuating part by rotating the fastener. Preferably, after engagement of the fastener with the actuating part, further rotation of the fastener causes movement of the actuating part in a direction towards the distal portions. In some embodiments the actuating part is moved in a direction towards the distal portions by axial movement of the fastener.

In preferred embodiments movement of the actuating part in the direction towards the distal portions causes a proximal end of each of the anchor portions to move in a radially outward direction.

The actuating part may comprise a contact surface and the anchor portion of each arm may include a sloped bearing surface. In these embodiments the method comprises moving the actuating part such that the contact surface contacts each of said bearing surfaces to cause radially outwards movement of a part of the anchor portions. The contact surface may be a ramp surface.

In some embodiments the method comprises, before inserting the fixing device in the hole, folding each arm about a live hinge between the arm and the actuating part to move the arms from the initial configuration to the insertion configuration.

BRIEF DESCRIPTION OF THE DRAWINGS

The invention will now be further described by way of example only and with reference to the accompanying drawings, in which:

FIGS. 14 and 15 show the fixing device of the first embodiment disposed in a wall and in an expanded configuration, and used to secure a hook to the wall by means of a threaded fastener;

FIG. 16 is a sectioned perspective view of the fixing device, threaded fastener and hook of FIG. 14;

FIG. 25 is a perspective view of a third preferred embodiment of a fixing device according to the present invention, the fixing device being in an initial configuration;

FIG. 26 is a plan view from above of the fixing device of FIG. 25 in the initial configuration;

FIG. 27 is a perspective view of the fixing device of FIG. 25 in a partially folded configuration;

FIGS. 28 to 30 are, respectively, a perspective view, a side view and a plan view from above of the fixing device of FIG. 25 in an insertion configuration;

DETAILED DESCRIPTION

Figure 1:
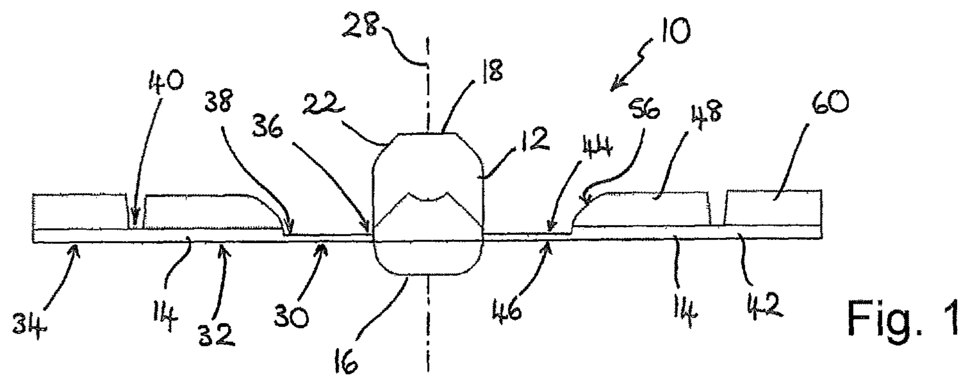
FIG. 1 is a side view of a first preferred embodiment of a fixing device according to the present invention, the fixing device being in an initial configuration.

FIGS. 1 to 16 illustrate a fixing device 10 according to a preferred embodiment of the invention. The fixing device 10 will typically be used as a wall fixing to secure an object to a surface of a wall, and may be used to secure an object to a cavity wall. It will be appreciated, however, that the fixing device 10 is suitable for installation in any other similar structure such as a ceiling or a floor. In particularly preferred embodiments, the fixing device 10 is used to secure an item or object to plasterboard, which typically has a thickness of between 9 mm and 15 mm.

It is envisaged that the fixing device 10 will be made from a suitable semi-rigid or rigid polymeric material. A suitable polymeric material is, for example, acetyl or polyoxymethylene (POM), or nylon (polyamide). Preferably the fixing device is made of a thermoplastic polymer and is formed by injection moulding.

The fixing device 10 comprises an actuating part or hub 12 and a plurality of spokes or arms 14 extending from the hub 12. In the illustrated embodiment the hub 12 is substantially cuboidal having two end faces 16, 18 and four side faces 20. A ramp surface or bevel surface 22 is formed between the second end face 18 of the hub 12 and each of the side faces 20 around a perimeter of the second end face 18. Each ramp surface 22 acts as a contact surface for applying a force to a part of one of the arms 14, as described further below. It will be appreciated that the contact surface may not be a flat ramp surface 22 but, in other embodiments, may be curved or of any other suitable shape.

The first end face 16 of the hub 12 forms a head of the fixing device 10 and, in this embodiment, an edge 24 between the first end face 16 and each of the side faces 20 is bevelled or curved. A bore 26 extends through the hub 12 between the first and second end faces 16, 18. The bore 26 may be threaded to receive a threaded fastener such as a screw or bolt. The bore 26 extends along an axis 28 of the fixing device 10.

An arm 14 extends from each of the side faces 20 so that, in this embodiment, the fixing device 10 includes four arms 14. Each of the arms 14 comprises a first wing section or connecting portion 30 at a proximal end of the arm 14, a second wing section or anchor portion 32 adjacent the connecting portion 30, and a distal or collar portion 34 at a distal end of the arm 14. The connecting portion 30 is hingedly connected to the hub 12 at a first hinge portion 36. The anchor portion 32 is hingedly connected to the connecting portion 30 at a second hinge portion or elbow joint 38. The collar portion 34 is hingedly connected to the anchor portion 32 at a third hinge portion 40. In preferred embodiments, the fixing device 10 is a single, unitary piece made of a suitable polymeric material. The first, second and third hinge portions 36, 38, 40 are, therefore, preferably live hinges formed by relatively thinner regions of the polymeric material.

Each of the arms 14 comprises a planar stem 42 having opposite first and second surfaces 44, 46. The stem 42 extends fully along the length of the arm 14 between the proximal and distal ends of the arm 14. A thickness and/or width of the stem portion 42 may vary along the length of the arm 14. A first prominence 48 extends from the first surface 44 of the stem 42 in the anchor portion 32. Sides or abutment surfaces 50 of the first prominence 48 extending along the length of the arm 14 are tapered or sloped inwardly in a direction away from the stem 42 towards a guide surface 52. The guide surface 52 includes a groove or channel 54 that extends along the full length of the guide surface 52 parallel with the length of the arm 14. In this embodiment the channel 54 creates a concave part-cylindrical guide surface 52. A proximal end surface 56 of the first prominence 48 is sloped to provide a bearing surface 58. The proximal end surface 56 is sloped away from the stem 42 in a direction away from the hub 12. In this embodiment the bearing surface 58 has a convex curvature.

A second prominence 60 extends from the first surface 44 of the stem 42 in the collar portion 34. Sides or abutment surfaces 62 of the second prominence 60 extending along the length of the arm 14 are tapered or sloped inwardly in a direction away from the stem 42 towards an axial passage surface 64. The axial passage surface 64 includes a groove or channel 66 that extends along the full length of the axial passage surface 64 parallel with the length of the arm 14. In this embodiment the channel 66 creates a concave part-cylindrical axial passage surface 64.

A region of the stem 42 between the first and second prominences 48, 56 forms the third hinge portion 40.

In this embodiment, there are no projections from either of the first or second surfaces 44, 46 of the stem 42 in the connecting portion 30.

Figure 2:
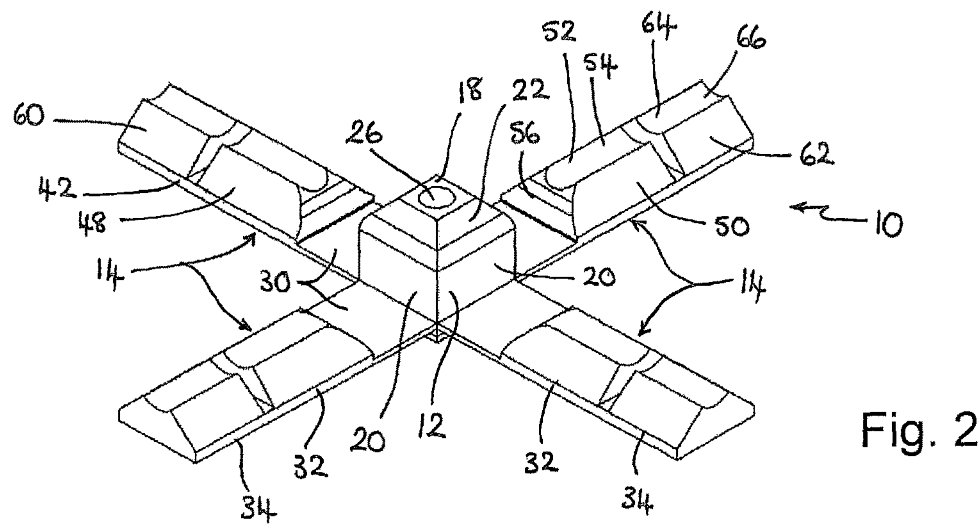
FIG. 2 is a perspective view of the fixing device of FIG. 1 in the initial configuration.
Figure 3:
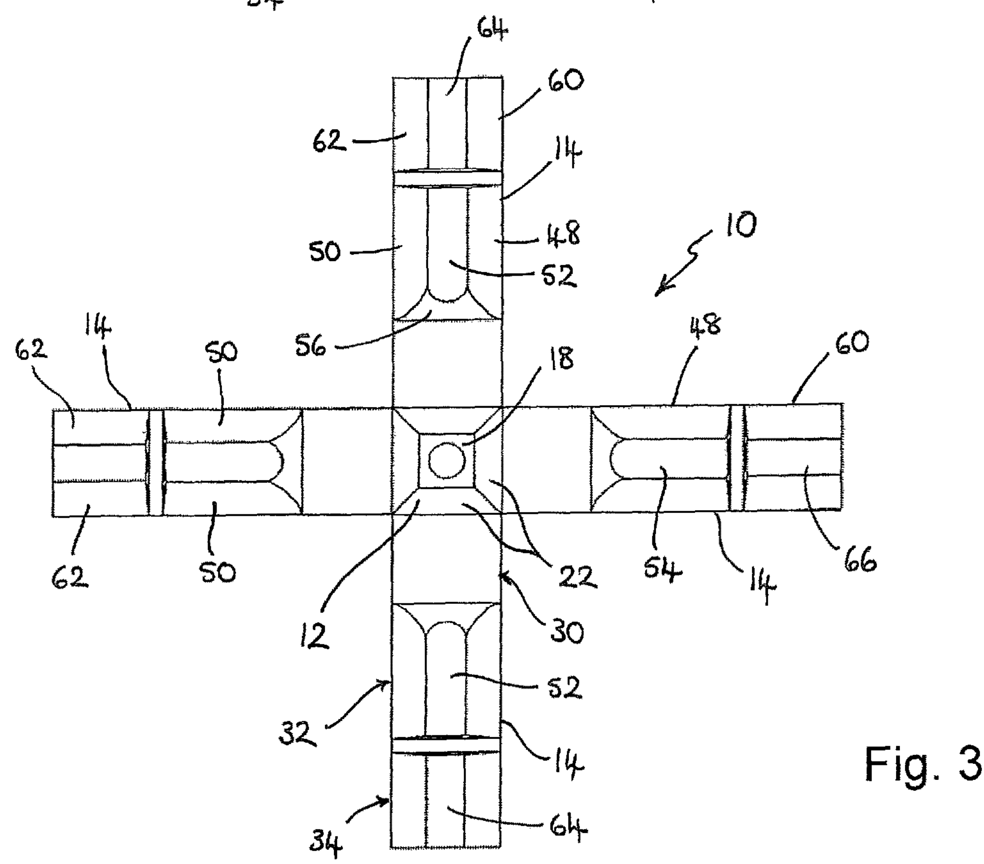
FIG. 3 is a plan view from above of the fixing device of FIG. 1 in the initial configuration.

FIGS. 1 to 3 show the fixing device 10 in an initial configuration. The fixing device 10 is initially manufactured or moulded in this configuration, with the arms 14 splayed around the hub 12. In the initial splayed configuration, the arms 14 may extend from the hub 12 in any direction that is not aligned with the axis 28 of the fixing device. In particular, the arms 14 may extend from the hub 12 such that there is an angle of between 5° and 90° between the arm 14 and the axis 28. In this embodiment, each of the arms 14 extends from the hub 12 in a direction substantially perpendicular to the axis 28, such that the stems 42 of the arms 14 lie in the same plane and this plane extends substantially perpendicularly to the axis 28 of the fixing device 10. Furthermore, because in this embodiment the fixing device 10 includes four arms 14, adjacent arms 14 extend from the hub 12 substantially at right angles to each other.

The arms 14 are connected at their proximal end to the hub 12 at a distance from the second end face 18 such that a majority of each of the side faces 20 of the hub 12 is disposed between the respective first hinge portion 36 and the second end face 18.

Figure 4:
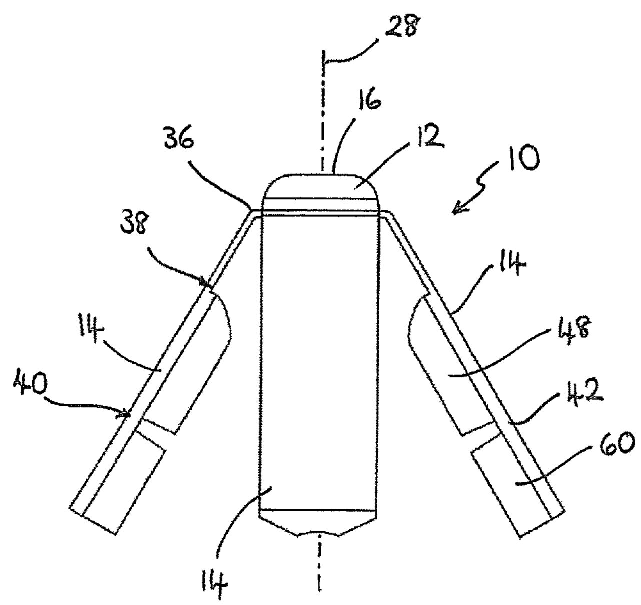
FIG. 4 is a side view of the fixing device of FIG. 1 in a partially folded configuration.
Figure 5:
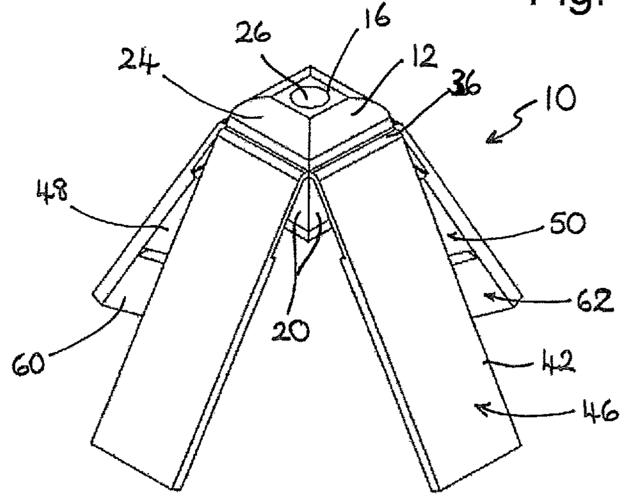
FIG. 5 is a perspective view of the fixing device of FIG. 4 in the partially folded configuration.
Figure 8:
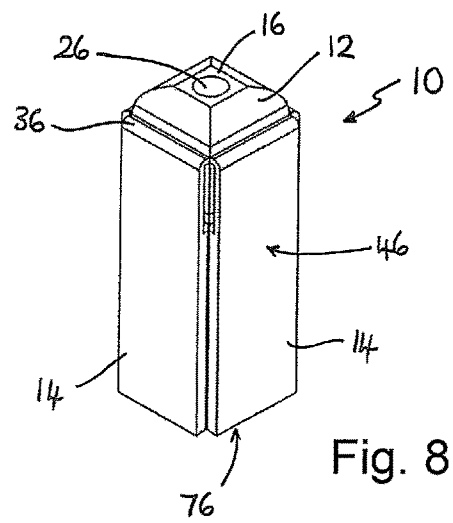
FIG. 8 is a perspective view of the fixing device of FIG. 7 in the insertion configuration.
Figure 6:
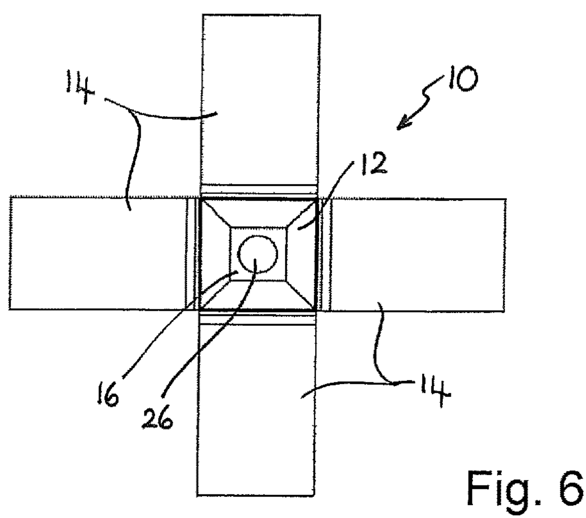
FIG. 6 is a plan view from above of the fixing device of FIG. 4 in the partially folded configuration.

FIGS. 4 to 6 show the fixing device 10 in a partially folded configuration, and FIGS. 7 to 11 show the fixing device 10 in a fully folded, insertion configuration. To move the fixing device 10 from the unfolded configuration to the insertion configuration, the arms 14 are each rotated about the first hinge portion 36 in a direction away from the head 16 of the hub 12. Each of the arms 14 is rotated about the respective first hinge portion 36 through about 90° so that in the insertion configuration the arms 14 are aligned with each other. In preferred embodiments the stem 42 of each arm 14 extends in a direction substantially parallel to the axis 28 of the fixing device 10. The second surfaces 46 of the stems 42 of the arms 14 form a radially outer surface of the fixing device 10.

Figure 9:
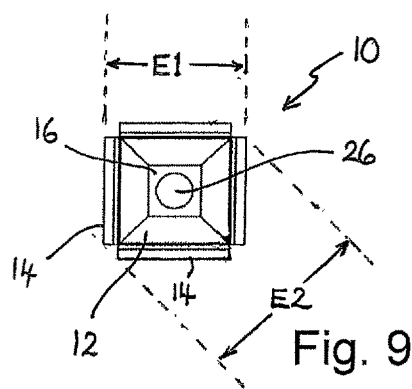
FIG. 9 is a plan view from above of the fixing device of FIG. 7 in the insertion configuration.
Figure 10:
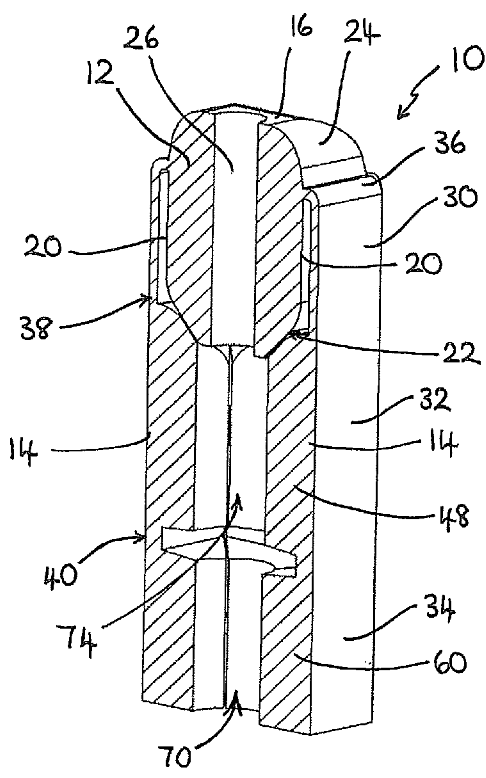
FIG. 10 is a sectioned perspective view of the fixing device of FIG. 7 in the insertion configuration.
Figure 11:
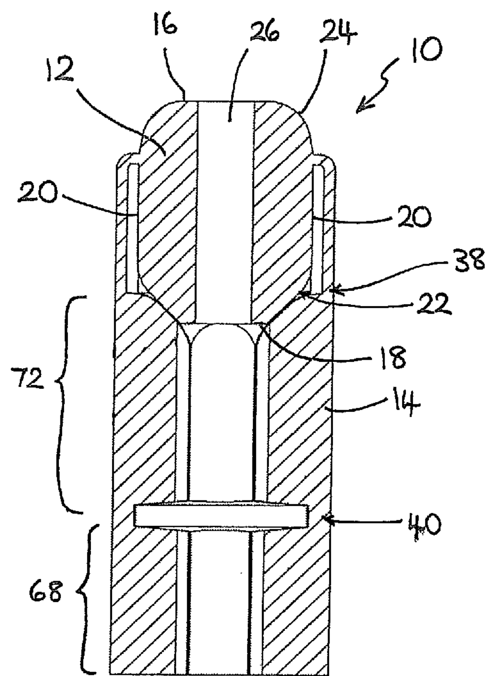
FIG. 11 is a longitudinal cross-sectional view of the fixing device of FIG. 7 in the insertion configuration.
Figure 12:
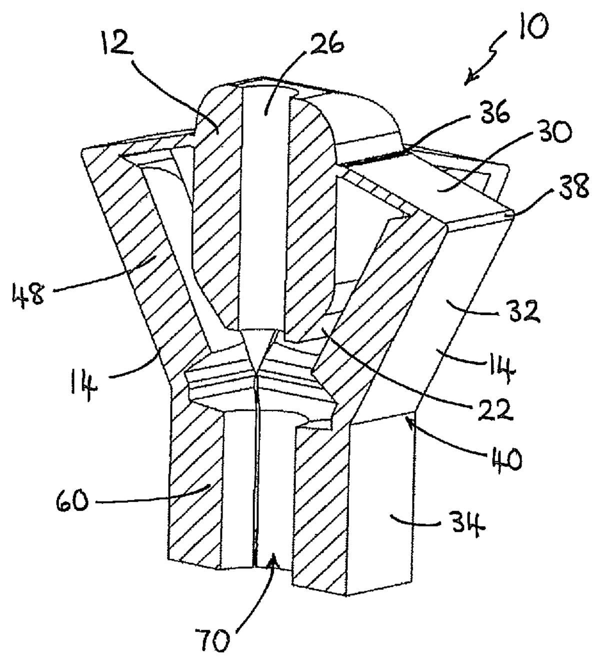
FIG. 12 is a sectioned perspective view of the fixing device of FIG. 7 in the expanded configuration.
Figure 13:
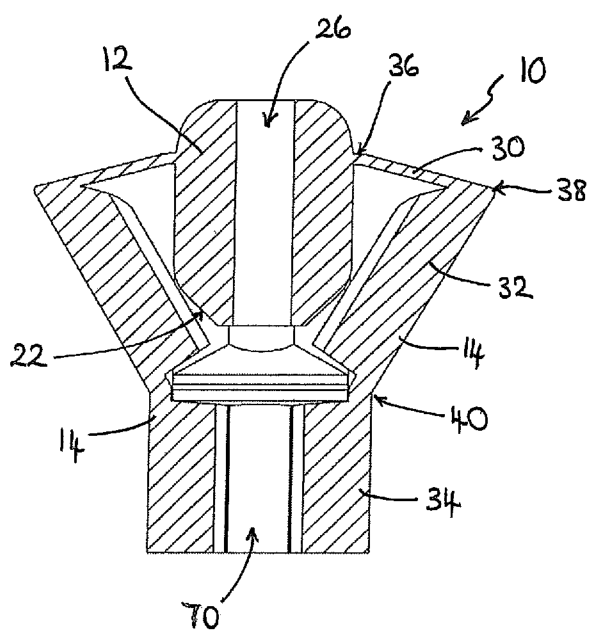
FIG. 13 is a longitudinal cross-sectional view of the fixing device of FIG. 7 in the expanded configuration.

In this embodiment of the fixing device 10, comprising four arms 14, a transverse cross-sectional shape of the fixing device 10, defined by the outer surface, is substantially square. A minimum external dimension (E1) of the fixing device 10 is defined as the distance between the second surfaces 46 of opposite arms 14, as shown in FIG. 9. A maximum external dimension (E2) of the fixing device 10 is defined as the distance between opposite corners of the substantially square outer surface.

Rotation of the arms 14 about the first hinge portions 36 is limited by contact between opposing abutment surfaces 50, 62 on adjacent arms 14. Furthermore, in this embodiment, the length of the connecting portion 30 is such that, in the insertion configuration, the ramp surface 22 of the hub 12 is in contact with the bearing surface 58 of the anchor portion 32. This is shown most clearly in FIGS. 10 and 11.

Figure 7:
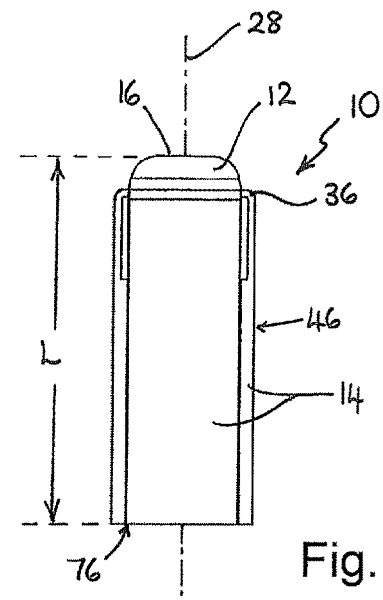
FIG. 7 is a side view of the fixing device of FIG. 1 in an insertion configuration.

In the insertion configuration, the collar portions 34 of the arms 14, and in particular the second prominences 60, form a plug section 68 of the fixing device 10. The channels 66 in the second prominences 60 define an axial passage 70 for receiving a fastener that extends through the plug section 68. Similarly, the anchor portions 32 of the arms 14, and in particular the first prominences 48, form a guide section 72 of the fixing device 10. The channels 54 in the first prominences 48 define a guide passage 74 for receiving a fastener that extends through the guide section 72. In the insertion configuration the guide passage 74 is aligned with the axial passage 70, and both the guide passage 74 and the axial passage 70 are aligned with the bore 26 through the hub 12. The distal ends of the arms 14 form an end 76 of the fixing device 10, and a length (L) of the fixing device 10 is defined between the head 16 and the end 76 when the fixing device 10 is in the insertion configuration, as shown in FIG. 7.

In this embodiment the diameters of the guide passage 74 and the axial passage 70 are substantially equal and are larger than the diameter of the bore 26 through the hub 12. Neither the guide passage 74 nor the axial passage 70 is threaded, and the diameters of these passages 70, 74 are such that the fastener extends through the guide passage 74 and the axial passage 70 without engaging with the plug section 68 or the guide section 72 of the fixing device 10.

The fixing device 10 is manufactured, preferably by injection moulding, in the initial, splayed configuration. To allow the fixing device 10 to be inserted into a hole in a wall, the fixing device 10 is moved into the insertion configuration. In some circumstances it may be beneficial if the arms 14 are folded into the insertion configuration or at least partially folded during the manufacturing process. The arms 14 may be retained in the fully folded configuration by welding or bonding together adjacent arms 14, or by mechanical interlocking of adjacent arms 14. For example, clips may be provided on the arms 14 that engage when the arms 14 are in the fully folded insertion configuration. Alternatively, the fixing device 10 may be supplied to a user in the initial configuration. The user then folds the arms 14 into the insertion configuration just before insertion of the fixing device 10 into a hole in a wall. In this case there is no need to secure the arms 14 to each other as the material of the wall surrounding the hole retains the arms 14 in such a position that the collar portions 34 of the arms 14 form the plug section 68 of the fixing device 10.

The use of the fixing device 10 to secure an object to a wall will now be described with additional reference to FIGS. 12 to 16. FIGS. 14 to 16 illustrate a plasterboard sheet 8 which will typically be adhered to a block or brick wall (not shown) by means of discrete areas or dabs of adhesive. A cavity is, therefore, formed between the wall and the plasterboard sheet 8 due to the thickness of the dabs of adhesive. In other cases, the plasterboard may be fixed to wooden or steel partitions which form wall structures within a building.

A user initially drills or in some other way forms a hole 2 in the plasterboard sheet 8 to receive the fixing device 10. The diameter of the hole 2 is preferably equal to or slightly larger than the minimum external dimension (E1) of the fixing device 10. The diameter of the hole 2 should not be greater than the maximum external dimension (E2) of the fixing device 10, so that there is a push fit or tap fit of the fixing device 10 into the hole 2.

The user then inserts the fixing device 10, head 16 first, into the hole 2. FIGS. 14 to 16 illustrate, in particular, the use of the fixing device 10 to secure a hook 6 to a wall 4 comprising the sheet of plasterboard 8. The thickness of the sheet of plasterboard 8 is less than the length (L) of the fixing device 10 such that the hub 12, the connecting portion 30 and at least a part of the anchor portion 32 extend beyond a rear surface 7 of the plasterboard sheet 8 with the fixing device 10 in the insertion configuration. The fixing device 10 is pressed into the hole 2 until the end 76 of the fixing device 10 is proximate or substantially flush with a front surface 9 of the wall 4. With the fixing device 10 fully inserted in the wall 4 the plug section 68 is disposed in the hole 2. Preferably the plug section 68 substantially fills the hole 2 with the axial passage 70 defined therethrough.

A fastener 80, in the form of a screw 80, is connected to an object to be secured to the wall 4, which in this example is a hook 6. The screw 80 is located through a hole in the hook 6 such that a head 82 of the screw 80 is disposed on a first side of the hook 6 and the thread 84 and tip 86 of the screw 80 extend from a second side of the hook 6.

The screw 80 is inserted into the axial passage 70 of the fixing device 10 and through the guide passage 74 of the guide section 72. In this embodiment an axis 81 of the fastener 80 is parallel to and co-axial with the axis 28 of the fixing device 10. The screw 80 is then screwed or rotated about its axis 81 so that the thread 84 of the screw 80 proximate the tip 86 enters the bore 26 of the hub 12 and engages with the hub 12. The bore 26 may be threaded or, alternatively, the tip 86 and thread 84 of the screw 80 may cut a thread in the hub 12 as the screw 80 is inserted into the bore 26.

The screw 80 is inserted further into the fixing device 10 until the hook 4 is clamped between the head 82 of the screw 80 and the front surface 9 of the wall 4. In this position the tip 86 of the screw 80 may extend beyond and protrude from the head 16 of the hub 12.

The fixing device 10 is not able to rotate in the hole 2 due to the square cross-sectional shape of at least the plug section 68 of the fixing device 10 and the diameter of the hole 2. Accordingly, further rotation of the screw 80 pulls the hub or actuating part 12 in an axial direction towards the plug section 68 of the fixing device 10.

This axial movement of the actuating part 12 causes the ramp surfaces 22 to apply a force to the bearing surfaces 58 of the arms 14, such that the bearing surfaces act as a cam surface. The force has both an axial and a radial component and causes the proximal end of each of the anchor portions 32 to move in a radially outwards direction. Each of the third hinge portions 40 flexes to accommodate this radially outwards movement of the respective anchor portion 32. Additionally, each of the connecting portions 30 rotates about the respective first hinge portion 36 so that the connecting portions 30 extend radially outwardly from the actuating part 12. The outwards movement of the anchor portions 32 and the connecting portions 30 causes each of the elbow joints 38 between the distal end of the connecting portion 30 and the proximal end of the anchor portion to bend. The elbow joint may bend through an angle of greater than 90°.

The lateral outwards movement causes the anchor portions 32 to contact, and in some cases press into, a portion of the rear surface 7 of the plasterboard sheet 8. The anchor portions 32 may also deform a rear section of the hole 2 in the wall 4. In this expanded configuration of the fixing device 10, shown most clearly in FIGS. 12 and 13, the first and second wing sections 30, 32 are in a laterally expanded position, with the elbow joints 38 defining a maximum radial extent of the fixing device 10. In this configuration, the fixing device 10 secures the object (e.g. hook 6) to the wall 4. In particular, the object is clamped to the wall 4 by the opposing forces applied by the head 82 of the screw 80 and the anchor portions 32 of the fixing device 10. The forces are dispersed both through the wall of the hole and through the material surrounding the hole, such that the forces are dispersed radially outwardly from the hole into the surrounding wall.

The anchor portions 32 are held in the expanded configuration by a force applied to them by the actuating part 12. This force is applied primarily by direct contact between the actuating part 12 and the guide surfaces 52. As such the actuating part 12 is received within the guide channel 74 when the fixing device 10 is in the expanded configuration.

In some embodiments each of the connecting portions 30 is sufficiently rigid and stiff that it acts as a strut between the actuating part 12 and the proximal end of the corresponding anchor portion 32. In these embodiments each of the connecting struts 30 transmits a force to the proximal end of the corresponding anchor portion 32 to resist radially inward movement of the proximal end of the anchor portion 32 or bending of the anchor portion 32 when a force is applied to the object or fastener 80.

Figure 17:
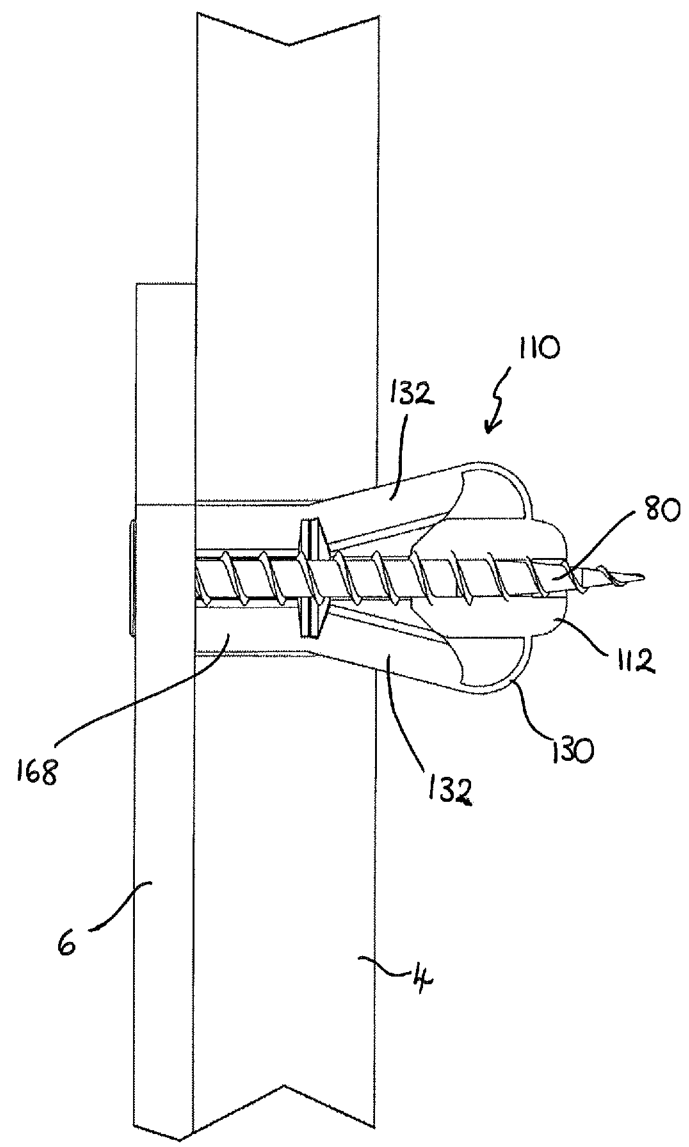
FIG. 17 is a cross-sectional view of the first embodiment of the fixing device disposed in a wall, the fixing device in an expanded configuration in which a connecting portion is buckled or bent.
Figure 18:
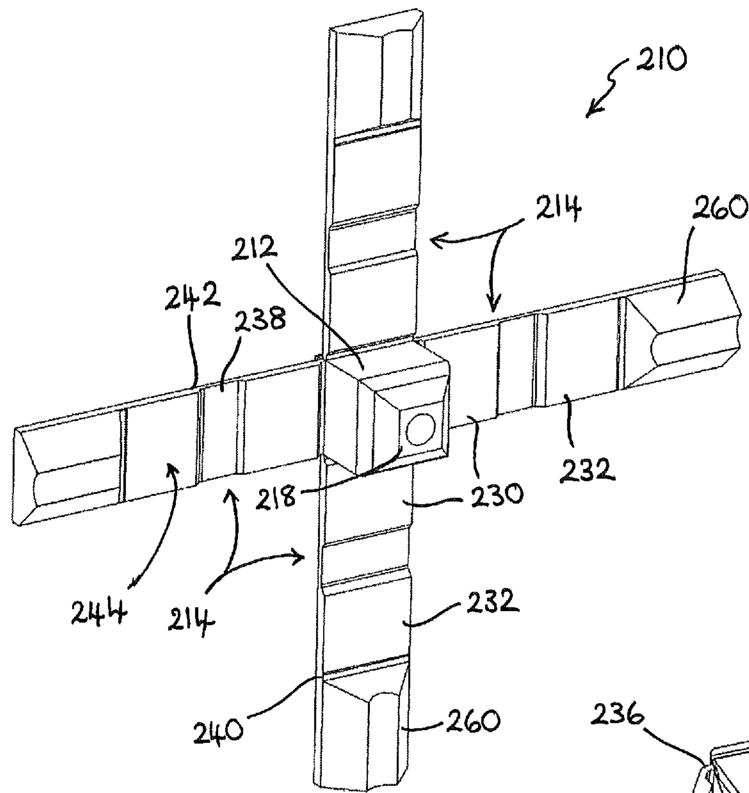
FIG. 18 is a perspective view of a second preferred embodiment of a fixing device according to the present invention, the fixing device being in an initial configuration.
Figure 19:
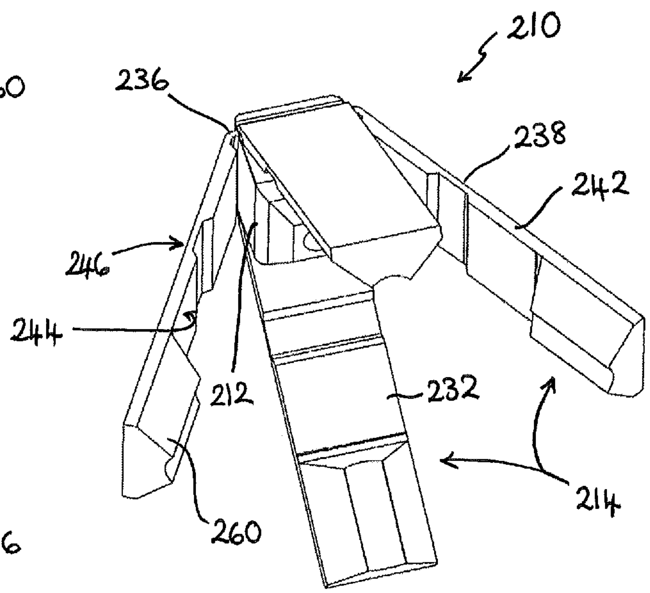
FIG. 19 is a perspective view of the fixing device of FIG. 18 in a partially folded configuration.
Figure 20:
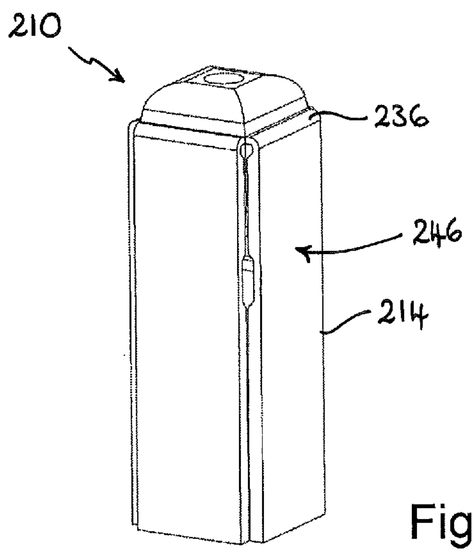
FIG. 20 is a perspective view of the fixing device of FIG. 18 in an insertion configuration.

It will be appreciated, however, that the connecting portions 30 do not need to be sufficiently stiff to act as struts so long as there is contact between the actuating part 12 and the guide surfaces 52 to retain the anchor portions 32 in an expanded configuration. A further embodiment of the fixing device 110 is illustrated in FIG. 17. In this embodiment, the fixing device 110 is substantially identical to the fixing device 10 of the first embodiment except that the stiffness of the connecting portions 130 is lower, such that the connecting portions 130 do not act as struts, but instead yield and flex or bend as the actuating part 112 is moved axially towards the plug section 168 of the fixing device 110. In some embodiments in which the connecting portion 130 is designed to bend it may not be necessary to include a hinge portion between the connecting portion 130 and the anchor portion 132; the change in angle being accommodated by bending of the connecting portion 130 rather than by rotation of the anchor portion and connecting portion about the hinge portion.

When a user wishes to remove the object from the wall 4, the fixing device 10 may, advantageously, also be easily removed together with the fastener 80. Referring again to the first embodiment of the fixing device 10, the screw 80 may be rotated in a second direction so as to unscrew the screw 80 from the fixing device 10. Initially, the rotation of the screw 80 in this second direction causes the actuating part 12 to move axially in a direction away from the plug section 68 of the fixing device 10. This axial movement of the actuating part 12 causes the elbow joints 38 to move radially inwardly and the connecting portions 30 and anchor portions 32 to return to the insertion configuration. In some circumstances, the actuating part 12 may not move axially as the screw 80 is rotated in the second direction. In these cases it may be necessary to apply an axial force to the screw 80, for example by tapping the screw 80, to cause the required axial movement of the actuating part 12 to return the fixing device 10 to substantially the insertion configuration.

Further rotation of the screw 80 withdraws the screw 80 from the actuating part 12. The screw 80 can then be fully withdrawn from the fixing device 10 to permit removal of the object, in this example the hook 6, from the wall 4. Alternatively, or additionally, the screw 80 may be retained in or reinserted into the actuating part 12 to allow a user to pull the fixing device 10 out of the hole in the wall 4, with the fixing device 10 in the insertion configuration.

A further embodiment of a fixing device 210 is illustrated in FIGS. 18 to 24. This fixing device 210 is substantially the same as the fixing device 10 of the first embodiment; like features have been indicated by reference numerals incremented by 200 and will not be described in detail with respect to this embodiment.

As in the previous embodiment, each of the arms 214 comprises a planar stem 242 having opposite first and second surfaces 244, 246. The stem 242 extends fully along the length of each arm 214 between the proximal and distal ends of the arm 214. In this embodiment, however, the anchor portion 232 of each arm 214 does not include a prominence extending from the first surface 244 of the stem 242.

In the insertion configuration, with the arms 214 aligned, the anchor portions 232 of the arms 214 form a guide section 272 of the fixing device 210. A guide passage 274 for receiving a fastener extends through the guide section 272 and is defined by the first surfaces 244 of the stems 242 of the arms 214. In this embodiment, therefore, the guide passage 274 forms a cavity for receiving an actuating part 212 of the fixing device 210 as the fixing device 210 is moved into an expanded configuration.

Figure 21:
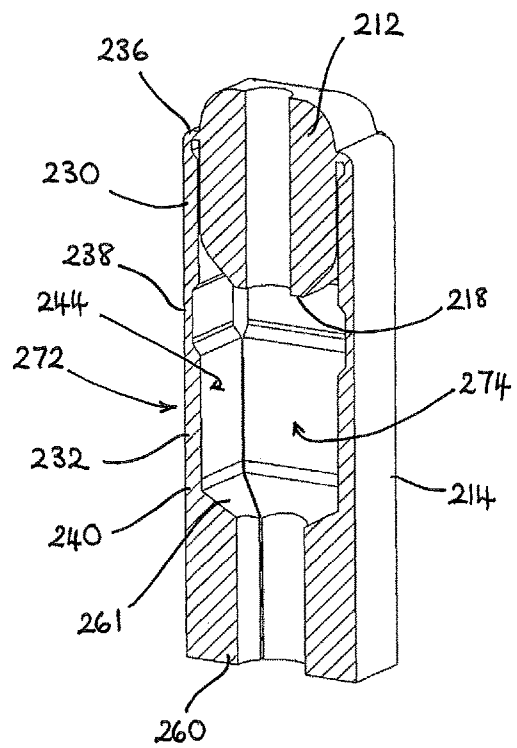
FIG. 21 is a sectioned perspective view of the fixing device of FIG. 20 in the insertion configuration.
Figure 22:
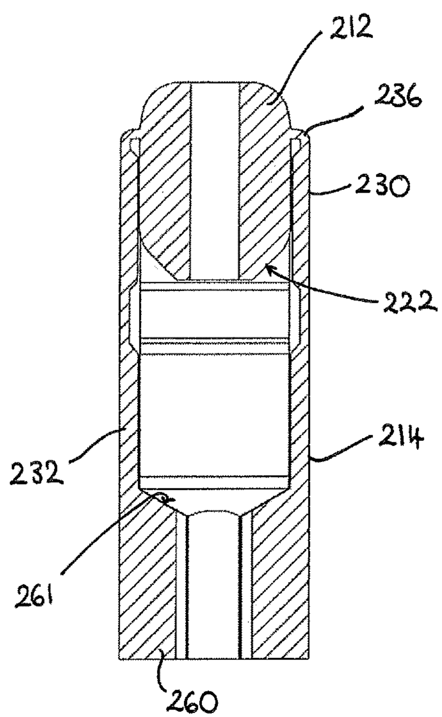
FIG. 22 is a longitudinal cross-sectional view of the fixing device of FIG. 20 in the insertion configuration.
Figure 23:
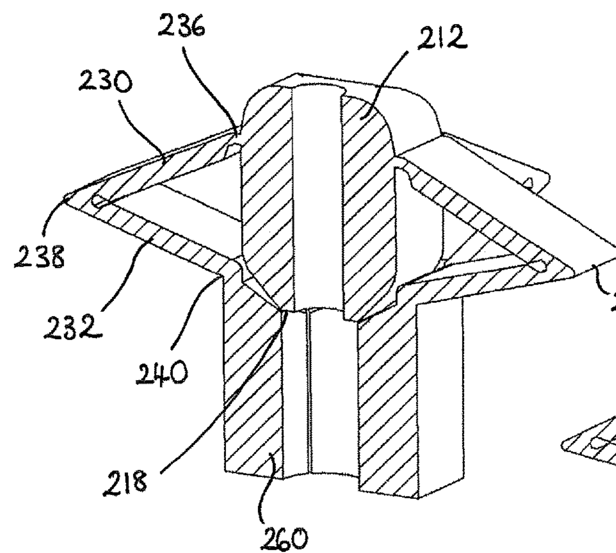
FIG. 23 is a sectioned perspective view of the fixing device of FIG. 20 in an expanded configuration.
Figure 24:
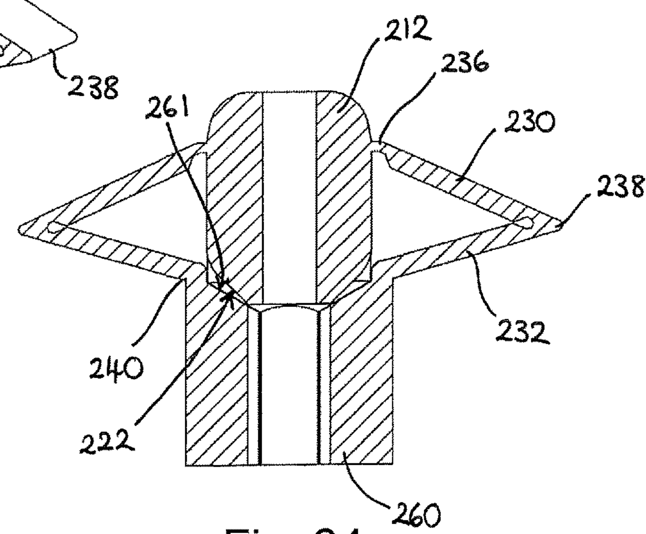
FIG. 24 is a longitudinal cross-sectional view of the fixing device of FIG. 20 in the expanded configuration.
Figure 31:
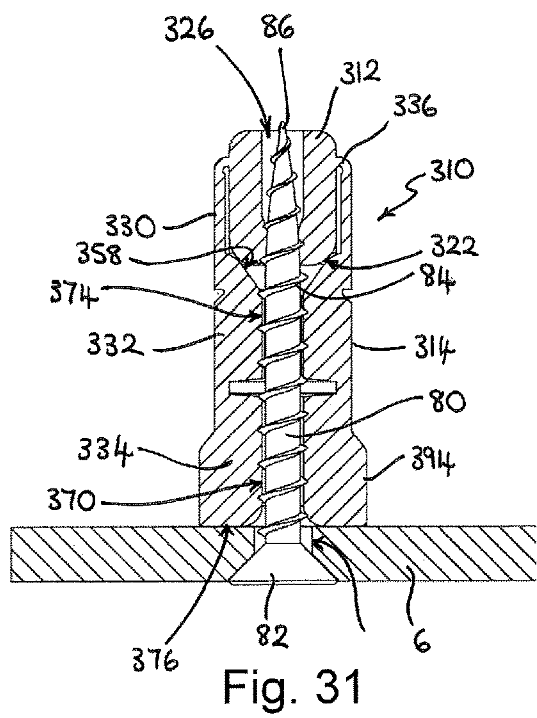
FIG. 31 is a cross-sectional view of the fixing device of FIG. 25 showing the engagement of a threaded fastener with the fixing device in the insertion configuration.

A fastener is used to move the fixing device 210 from the insertion configuration, shown in FIGS. 21 and 22, to the expanded configuration, shown in FIGS. 23 and 24, as described above in relation to the first embodiment. As the actuating part 212 is moved in a direction towards the distal ends of the arms 214, the connecting portion 230 of each arm 214 rotates about a first hinge portion 236 between the actuating part 212 and the connecting portion 230. The connecting portion 230 acts as a strut and applies a force to the proximal end of the respective anchor portion 232 to push this end of the anchor portion 232 in a laterally or radially outwards direction. This causes a second hinge portion 238, between the connecting portion 230 and the anchor portion 232, and a third hinge portion 240, between the anchor portion 232 and the collar portion 234, to bend or flex substantially as described above in relation to the first embodiment.

In this embodiment, the actuating part 212 does not contact the anchor portions 232 and the anchor portions 232 are held in the expanded configuration by the force applied to them by the connecting portions 230. In the expanded configuration, however, the actuating part 212 is received in the cavity formed by the anchor portions 232 and the locating of the actuating part 212 in this position assists in resisting radially inward movement of the proximal end of the anchor portions 232.

In a fully expanded position a second end face 218 of the actuating part 212 may contact a proximal end of the collar portions 234. In particular, in some embodiments, a ramp or bevel surface 222 is formed around a perimeter of the second end face 218 of the actuating part 212. Additionally, each collar portion 234 includes a prominence 260 extending from the first surface 244 of the stem 242, and a proximal end surface 261 of each prominence 260 includes a corresponding ramp or slope. In the fully expanded position, the bevel surface 222 of the actuating part 212 may contact the respective sloped proximal end surface 261 of the collar portion prominence 260.

A further embodiment of a fixing device 310 is illustrated in FIGS. 25 to 37. This fixing device 310 is substantially the same as the fixing device 10 of the first embodiment; like features have been indicated by reference numerals incremented by 300 and will not be described in detail with respect to this embodiment.

As described in the early embodiments, each of the arms 314 comprises a connecting portion 330 at a proximal end of the arm 314, an anchor portion 332 adjacent the connecting portion 330, and a distal or collar portion 334 at a distal end of the arm 314. The connecting portion 330 is hingedly connected to an actuating part or hub 312 at a first hinge portion 336, the anchor portion 332 is hingedly connected to the connecting portion 330 at a second hinge portion 338, and the collar portion 334 is hingedly connected to the anchor portion 332 at a third hinge portion 340.

In this embodiment the connecting portions 330 are tapered such that a width of the connecting portion 330 at the first hinge portion 336 is smaller or narrower than a width of the connecting portion 330 at the second hinge portion 338. This decreases the force required to bend the first hinge portion 336 to move the fixing device 310 from the initial configuration to the insertion configuration. Furthermore, axial edges 323 of the actuating part 312 between adjacent side faces 320 are rounded or bevelled to decrease the maximum cross-sectional dimension of the actuating part 312. This assists with insertion of the fixing device 310 into a hole in a wall.

A flange member 388 extends from a second surface 346 of a stem 342 of each arm 314 at a distal end of the arm 314. Each flange member 388, therefore, extends radially outwardly from the arms 314 of the fixing device 310 when the fixing device 310 is in an insertion configuration, as shown in FIGS. 28 to 30. Furthermore, when the arms 314 are aligned in the insertion configuration, the flange members 388 are contiguous or disposed adjacent each other so as to form a flange 390 extending outwardly around an end 376 of the fixing device 310.

Each flange member 388 has a first surface 392, which forms part of an end surface of the fixing device 310 in the insertion configuration, and an opposite second surface 393. A reinforcing fin or rib 394 extends from the second surface 393 of the flange member 388 in a direction towards the proximal end of the arm 314. The reinforcing fin 394 is attached to and extends along the second surface 346 of the stem 342 in the collar portion 334 of the arm 314. The reinforcing fins 394, therefore, extend radially outwardly from the arms 314 of the fixing device 310 when the fixing device 310 is in an insertion configuration. As well as strengthening the flange 390 of the fixing device 310, the reinforcing fins 394 also provide an anti-rotation feature of the fixing device 310, resisting rotation of the fixing device 310 within a hole during use of the fixing device 310.

The operation of this fixing device 310 is substantially similar to the operation of the fixing device 10 of the first embodiment.

During use, a fastener 80, for example a screw, is connected to an object 6 to be secured to a wall. The screw 80 is located through a hole 5 in the object 6 such that a head 82 of the screw 80 is disposed on a first side of the object 6 and the thread 84 and tip 86 of the screw 80 extend from a second side of the object 6.

The fixing device 310 is pressed into a hole 2 in a wall 4 or other similar structure. The fixing device 310 is pressed into the hole 2 until the flange 390 of the fixing device 310 is proximate or substantially flush with a front surface 9 of the wall 4. If the thickness of the wall 4 is less than the length of the fixing device 310, the hub 312, the connecting portion 330 and at least a part of the anchor portion 332 may extend beyond a rear surface 7 of the wall 4.

To secure the object 6 to the wall 4, the screw 80 is inserted into an axial passage 370 of the fixing device 310 and through a guide passage 374 of the guide section 372, as described in relation to the first embodiment. The screw 80 is then screwed or rotated so that the thread 84 of the screw 80 proximate the tip 86 enters a bore 326 of the hub 312 and engages with the hub 312. The screw 80 is inserted further into the fixing device 310 until the object 6 is clamped between the head 82 of the screw 80 and the end surface of the fixing device 310 defined by the flange 390.

Further rotation of the screw 80 then pulls the hub 312 in an axial direction towards the axial passage 370 of the fixing device 310. This axial movement of the hub 312 causes ramp surfaces 322 of the hub 312 to apply a force to bearing surfaces 358 of the anchor portions 332 of the arms 314. The force has both an axial and a radial component and causes the proximal end of each of the anchor portions 332 to start to move in a radially outwards direction. Additionally, the axial movement of the hub 312 causes the connecting portion 330 of each arm 314 to rotate about the first hinge portion 336. The connecting portion 330 then acts as a strut and applies a force to the proximal end of the respective anchor portion 332 to push this end of the anchor portion 232 in the radially outwards direction. Once the connecting portions 330 are applying the force to the anchor portions 332, the hub 312 may lose contact with the anchor portions 332 such that a force is only applied to the anchor portions 332 by the connecting portions 330 and not by the hub 312.

The outwards movement of the anchor portions 332 and the connecting portions 330 causes each of the second hinge portions 338 between the distal end of the connecting portion 330 and the proximal end of the anchor portion 332 to bend.

Continued axial movement of the hub 312 moves the hub 312 into a position in which it is disposed between the anchor portions 332 of the arms 314 and the fixing device 310 is in the expanded configuration. The hub 312 then contacts the anchor portions 332 and resists or prevents radially inward movement of the anchor portions 332 of the arms 314. In other words, the hub 312 acts as a wedge between the anchor portions 332 holding them in a radially expanded position. The axial travel of the hub 312 may be such that the second hinge portion 338 bends through an angle of greater than 90°, and a part of the connecting portion 330 may directly contact a proximal end of the anchor portion 332 other than at the second hinge portion 338. This further resists radially inward movement of the proximal end of each of the anchor portions 332.

Depending on the thickness of the wall 4 relative to the length of the fixing device 310, the strength or compressibility of the material from which the wall 4 is made, and the stiffness of the material from which the fixing device 310 is made, the third hinge portions 340 may bend or flex to a greater or lesser extent as the fixing device 310 moves into the expanded configuration. If the wall 4 is made from a relatively strong material and is relatively thin such that the third hinge portions 340 are disposed beyond a rear surface 7 of the wall 4, then the third hinge portions 340 are liable to bend to a greater extent than if the third hinge portions 340 are disposed within the thickness of the wall 4 and/or the wall 4 is made of a relatively weaker or more compressible material.

Figure 32:
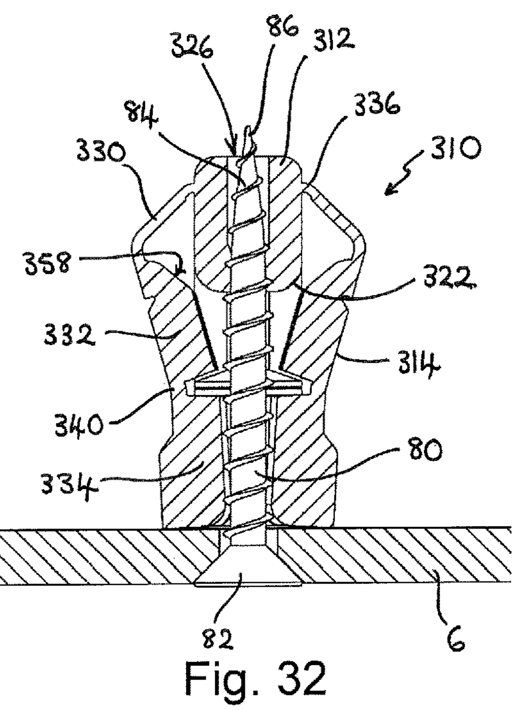
FIGS. 32 to 34 are, respectively, cross-sectional views of the fixing device of FIG. 31 showing stages of the movement of the fixing device from the insertion configuration to an expended configuration.
Figure 33:
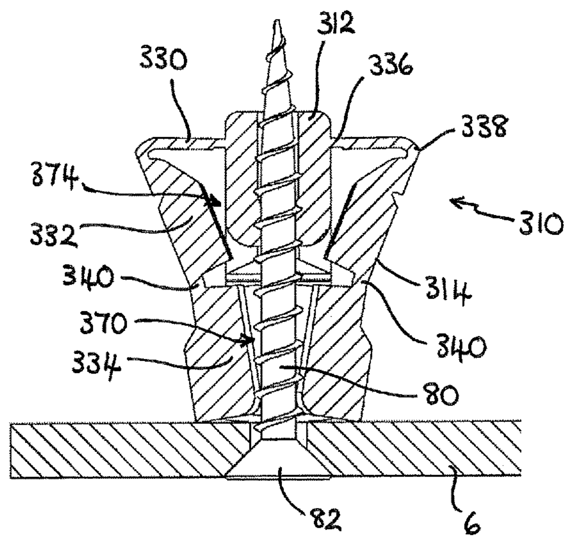
Figure 34:
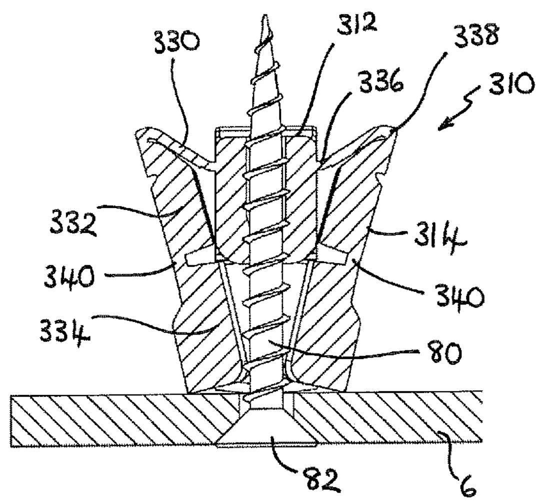
Figure 35:
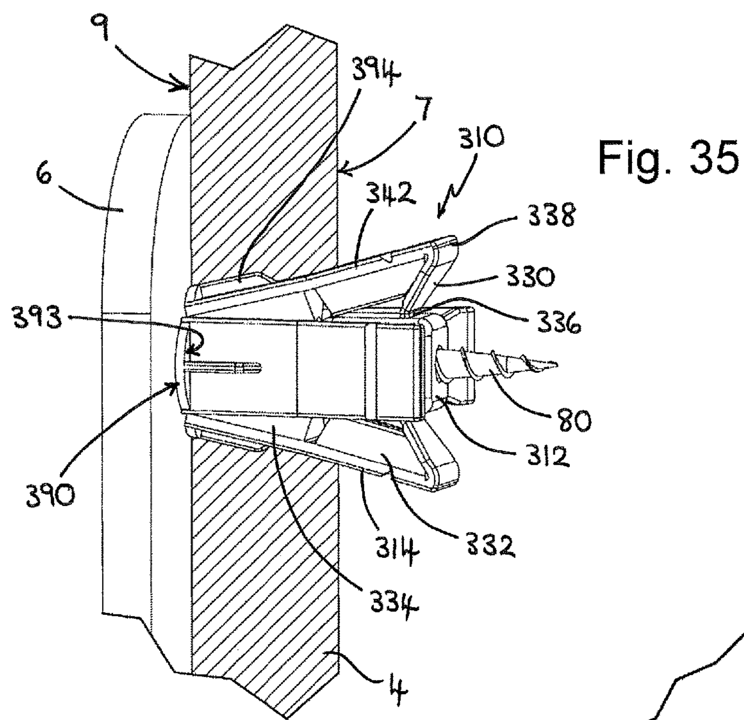
FIGS. 35 and 36 show the fixing device of FIG. 25 disposed in a first thickness of wall and in an expanded configuration.
Figure 36:
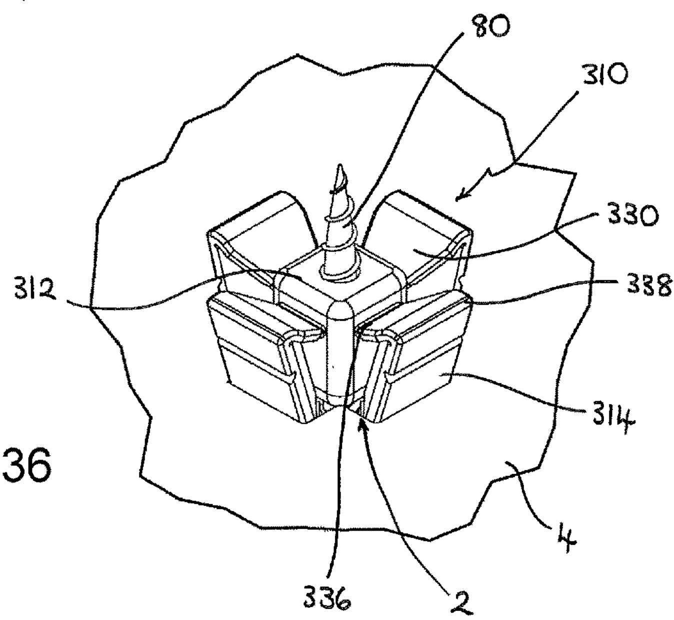

As illustrated in FIGS. 32 to 34, in some cases, during a first phase of axial movement of the hub 312, the third hinge portion 340 may bend so that the stem 342 of the arm 314 in the anchor portion 332 is not parallel to or aligned with the stem 342 of the arm 314 in the collar portion 334. During a subsequent phase of axial movement of the hub 312 the hub 312 may also contact the collar portions 334 and force a proximal end of the collar portions 334 in a radially outward direction, such that the third hinge portion 340 flexes back so that the stem 342 of the arm 314 in the anchor portion 332 is again parallel to or aligned with the stem 342 of the arm 314 in the collar portion 334.

Figure 37:
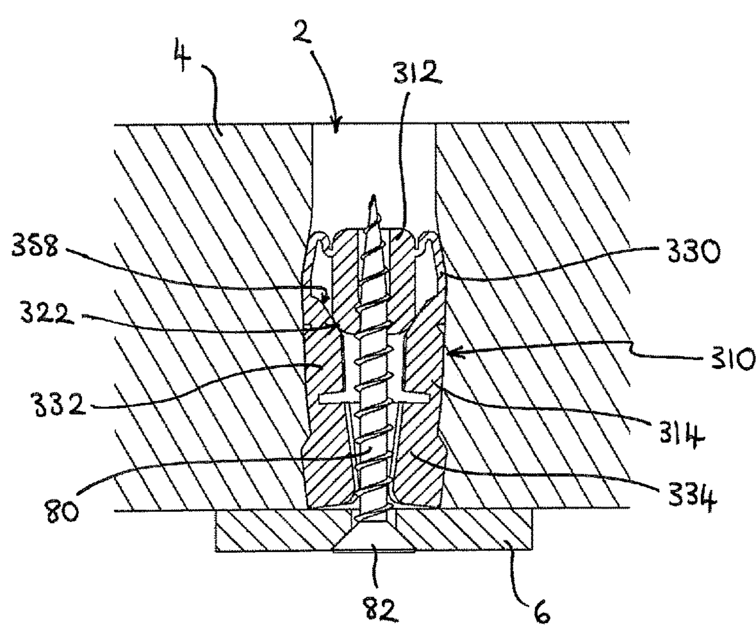
FIG. 37 shows the fixing device of FIG. 25 disposed in a second thickness of wall and in an expanded configuration.
Figure 38:
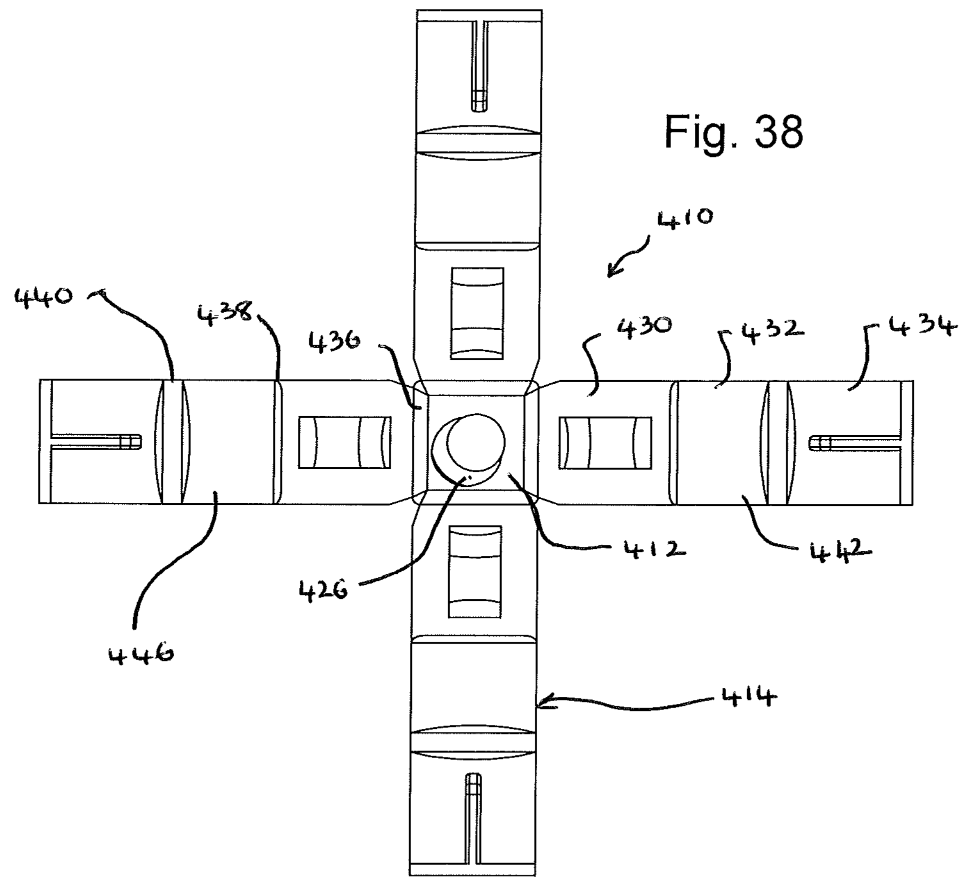
FIG. 38 is a plan view from below of a fourth preferred embodiment of a fixing device according to the present invention, the fixing device being in an initial configuration.
Figure 39:
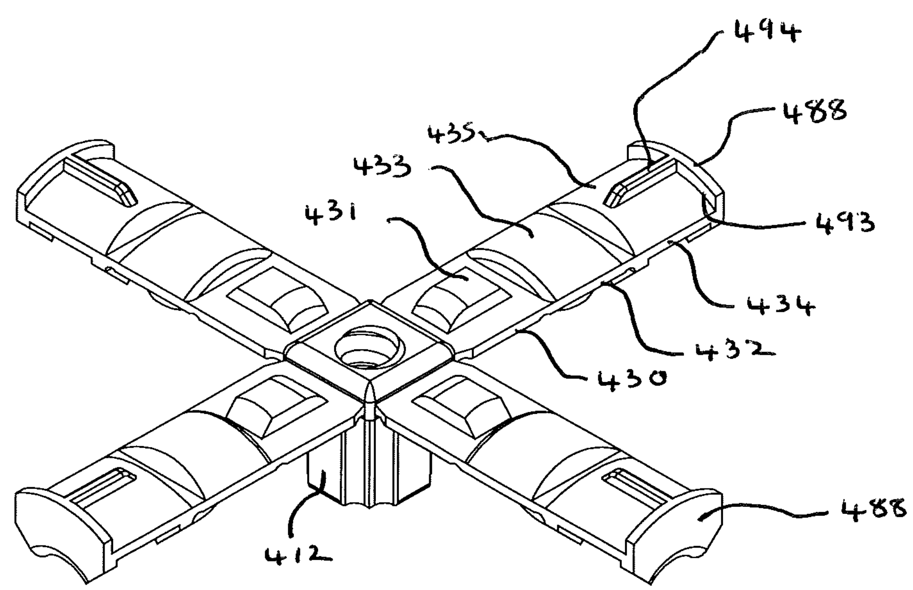
FIG. 39 is a perspective view of the fixing device of FIG. 38 in the initial configuration.

FIG. 37 illustrates an example in which the fixing device 310 is disposed in a hole 2 in a wall 4, and in which the thickness of the wall 4 is greater than a length of the fixing device 310. In this example the anchor portions 332 of the arms 314 are constrained by the surrounding wall 4 and any significant radially outward movement of the anchor portions 332 is restricted. As the actuating part or hub 312 is pulled in an axial direction, through cooperation with the fastener 80, the connecting portions 330 buckle. The hub 312 is, however, in contact with the anchor portions 332 and applies a radially outwards force to the anchor portions 332. The anchor portions 332 of the arms 314, therefore, press into or apply a force to the material of the wall 4 surrounding the hole 2 so that the fixing device 310 effectively grips the wall 4. In some cases the connecting portions 330 may stretch or even break as the hub 312 moves axially; however, the hub 312 retains an outward force on the anchor portions 332 to retain the fixing device 310 in the hole 2. If the connecting portions 330 break during use of the fixing device 310, and the fastener 80 is removed from the fixing device 310, it may not be possible to relocate the fastener 80 in the hub 312 and reuse the fixing device 310 as the hub 312 may have separated from the rest of the fixing device 310.

A further embodiment of a fixing device 410 is illustrated in FIGS. 38 to 46. This fixing device 410 is substantially the same as the fixing device 10 of the first embodiment; like features have been indicated by reference numerals incremented by 400 and will not be described in detail with respect to this embodiment.

As described in the earlier embodiments, each of the arms 414 comprises a connecting portion 430 at a proximal end of the arm 414, an anchor portion 432 adjacent the connecting portion 430, and a distal or collar portion 434 at a distal end of the arm 414. The connecting portion 430 is hingedly connected to an actuating part or hub 412 at a first hinge portion 436, the anchor portion 432 is hingedly connected to the connecting portion 430 at a second hinge portion 438, and the collar portion 434 is hingedly connected to the anchor portion 432 at a third hinge portion 440.

Figure 46:
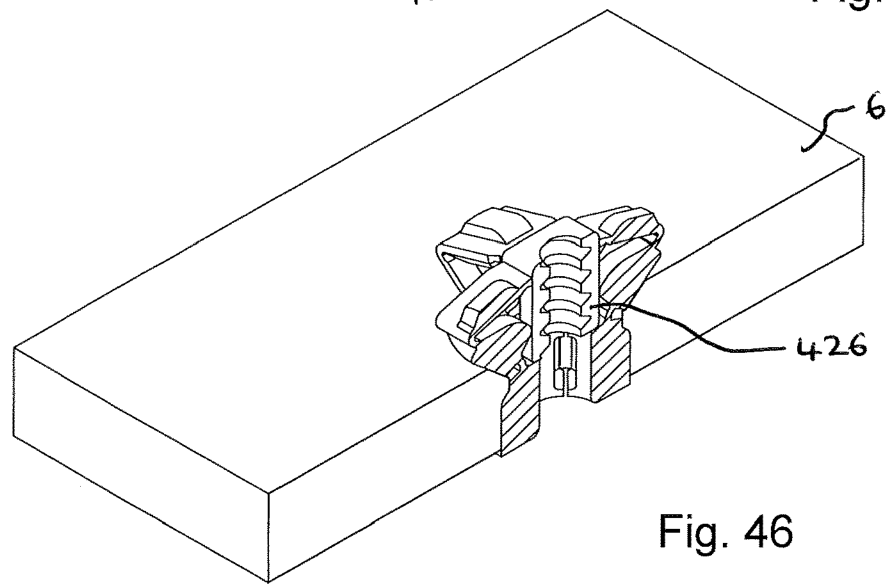
FIG. 46 is a sectioned perspective view of the fixing device of FIG. 38 in the expanded configuration.

In this embodiment, the actuating part/hub 412 is again substantially cuboidal and comprises two end faces 416, 418. The hub 412 comprises a bore 426 which extends through the hub 412 between the first and second end faces 416, 418 and the bore 426 is threaded, as shown in FIG. 46. A ramp surface or bevel surface 422 is formed around the second end face 418. Each ramp surface 422 acts as a contact surface for applying a force to a part of a respective arm 414 as described below.

Each of the arms 414 comprises a substantially planar stem 442 having opposite first and second surfaces 444, 446. Again, a first prominence 448 extends from the first surface 444 of the stem 442 in the anchor portion 432. A surface 452 of the first prominence 448 is shaped to provide a bearing (cam) surface 458 and, in particular, provides a cam action as the hub 412 moves relative to the anchor portion 432.

The cam surface 458 of the first prominence 448 comprises a first/initial section 455. In this first section 455, the bearing surface 458 urges the anchor portions 432 outwardly. In particular, translational movement of the hub 412 between the first prominences 448 forces the anchor portions 432 and the arms 414 outwardly. As the ramp surface 422 moves further due to the threaded action of the screw fastener, the ramp surface 422 moves over the peak/crest/nose 457 provided by the cam surface 458 and the cam surface 458 provides a second/final section 459. The resistance to the movement of the hub 412 thereby decreases and this may be sensed by a person screwing the fastener. The further screwing action will continue to move the hub 412 until the ramp surface 422 and second end 418 face contacts and abuts a seat 437 defined by the collar portion 434.

In the collar portion 434, each stem 442 comprises a second prominence 460. A proximal end of the second prominence 460 provides a contact surface 461. In the insertion configuration, the second prominence 460 of the collar portions 434 provide a contiguous surface which defines a seat 437 for receiving the second end 418 of the hub 412. As the hub 412 is advanced to the secured position, the resistance to movement will suddenly increase as the second end face 418 reaches and abuts the seat 437 provided by the contact surfaces 461. This will signal to the user that the end position has been reached. Accordingly, in this embodiment, the cam surface 458 and seat 437 act to provide feedback to the user and signals the relative position of the hub 412 within the device 410. In the final position, the hub 412 locates between the anchor portions 432 and resists (prevents) radial inward movement of the arms 414.

Figure 40:
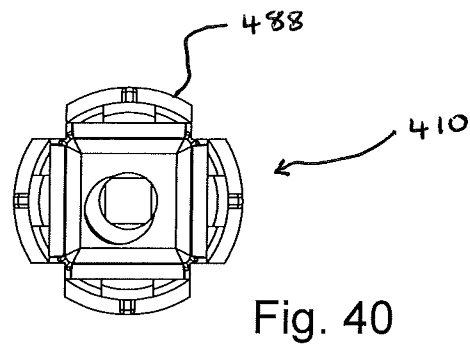
FIG. 40 is a plan view from below of the fixing device of FIG. 38 in the insertion configuration.
Figure 41:
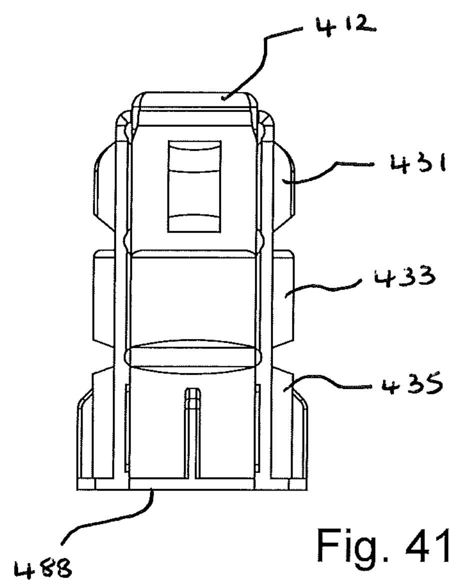
FIG. 41 is a side view of the fixing device of FIG. 38 in the insertion configuration.
Figure 42:
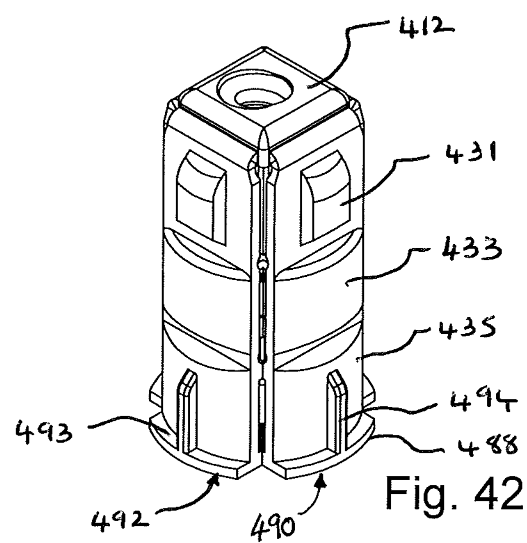
FIG. 42 is a perspective view of the fixing device of FIG. 38 in the insertion configuration.
Figure 43:
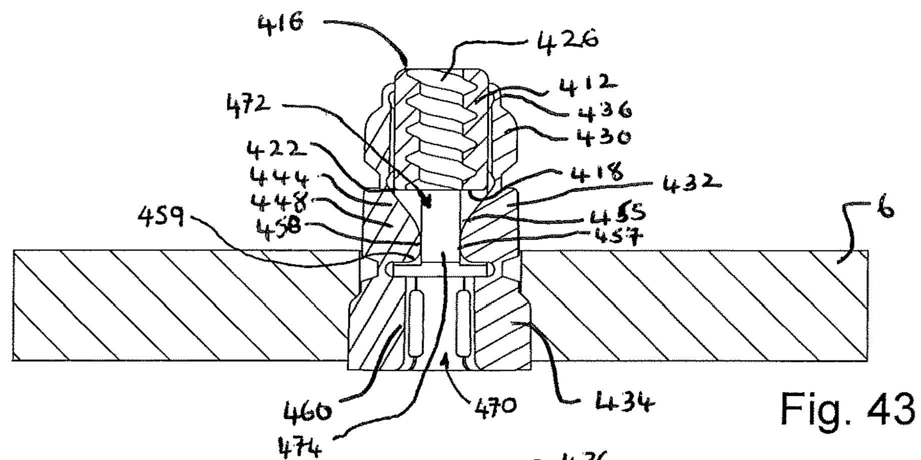
FIGS. 43 to 45 are, respectively, cross sectional views of the fixing device of FIG. 38 showing stages of movement of the fixing device from the insertion configuration to the expanded configuration.
Figure 44:
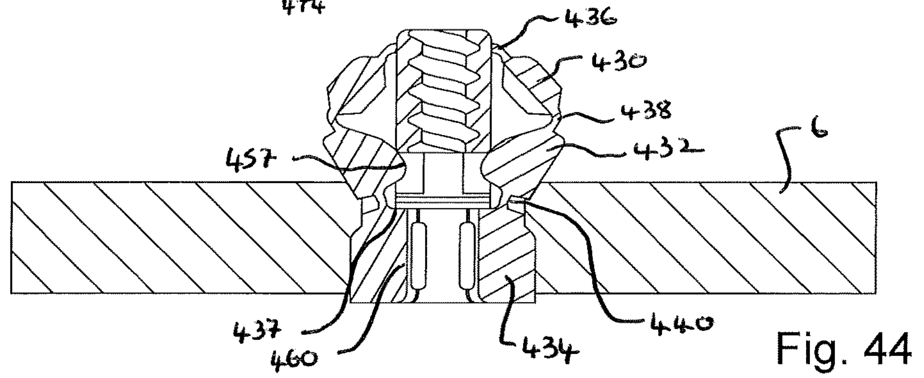
Figure 45:
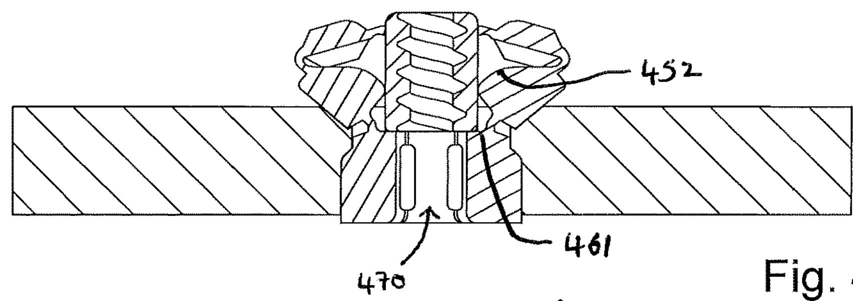

A flange member 488 extends from a second surface 446 of the stem 442 of each arm 414 at a distal end of the arm 414. Each flange member 488, therefore, extends radially outwardly from the arms 414 of the fixing device 410 when the fixing device 410 is in an insertion configuration, as shown in FIGS. 40 to 42.

Each flange member 488 has a first surface 492, which forms part of an end surface of the fixing device 410 in the insertion configuration, and an opposite second surface 493. A reinforcing fin or rib 494 extends from the second surface 493 of the flange member 488 in a direction towards the proximal end of the arm 414. The reinforcing fin 494 is attached to and extends along the second surface 446 of the stem 442 in the collar portion 434 of the arm 414. The reinforcing fins 494, therefore, extend radially outwardly from the arms 414 of the fixing device 410 when the fixing device 410 is in an insertion configuration. As well as strengthening the flange 490 of the fixing device 410, the reinforcing fins 494 also provide an anti-rotation feature of the fixing device 410, resisting rotation of the fixing device 410 within a hole during use of the fixing device 410.

In this embodiment, the outer surfaces 446 of the arms 414 comprise raised portions 431, 433, 435 to create an outer profile. The outer profile of the device 410 in the insertion configuration is generally cylindrical. The first raised portion 431 on the connecting portion 430 provides a ramped surface to aid insertion of the device 410 into a passage which may be generally cylindrical. The lateral dimension of the first raised portion 431 may be less than the lateral width of the arm 414 such that the side edges of the first raised portion 431 are spaced from the edges of the arm 414.

The second raised portion 433 provided on the anchor portion 432 extends for the full lateral width of the arm 414. The second raised portions 433 provide a part cylindrical surface and the second raised portions 433 may combine to form a contiguous cylindrical section. Similarly, the third raised portions 435 provided on the collar portions 434 provide a part cylindrical surface and the third raised portions 435 may combine to form a contiguous cylindrical section.

The operation of this fixing device 410 is substantially similar to the operation of the fixing device 10 of the first embodiment and is briefly described below.

During use, a fastener 80, for example a screw, is connected to an object 6 to be secured to a wall. The screw 80 is located through a hole 5 in the object 6 such that a head

82 of the screw 80 is disposed on a first side of the object 6 and the thread 84 and tip 86 of the screw 80 extend from a second side of the object 6.

The fixing device 410 is pressed into a hole 2 in a wall 4 or other similar structure. The outer surfaces of the raised portions 431, 433, 435 aids the insertion of the fixing device 410. The fixing device 410 is pressed into the hole 2 until the flange 490 of the fixing device 410 is proximate or substantially flush with a front surface 9 of the wall 4. If the thickness of the wall 4 is less than the length of the fixing device 410, the hub 412, the connecting portion 430 and at least a part of the anchor portion 432 may extend beyond a rear surface 7 of the wall 4.

To secure the object 6 to the wall 4, the screw 80 is inserted into an axial passage 470 of the fixing device 410 and through a guide passage 474 of the guide section 472, as described in relation to the first embodiment. The screw 80 is then screwed or rotated so that the thread 84 of the screw 80 proximate the tip 86 enters a bore 426 of the hub 412 and engages with the hub 412. The screw 80 is inserted further into the fixing device 410 until the object 6 is clamped between the head 82 of the screw 80 and the end surface of the fixing device 410 defined by the flange 490.

Further rotation of the screw 80 then pulls the hub 412 in an axial direction towards the axial passage 470 of the fixing device 410. This axial movement of the hub 412 causes ramp surfaces 422 of the hub 412 to apply a force to bearing surfaces 458 on the first prominences 448 of the anchor portions 432 of the arms 414. The force has both an axial and a radial component and causes the proximal end of each of the anchor portions 432 to start to move in a radially outwards direction. Additionally, the axial movement of the hub 412 causes the connecting portion 430 of each arm 414 to rotate about the first hinge portion 436. The connecting portion 430 then acts as a strut and applies a force to the proximal end of the respective anchor portion 432 to push this end of the anchor portion 432 in the radially outwards direction.

As mentioned above, as the hub 412 moves within the fixing device 410, the ramp surfaces 422 on the second end 418 of the hub 412 travel over respective cam surfaces provided on the first prominences 448. The shape of the cam surfaces causes the anchor portions 432 to flex outwardly and the resistance to movement of the hub 412 increases. Further movement causes the ramp surfaces 422 to travel over the nose portions 457 of the cam surfaces and the resistance to movement of the hub 412 decreases. The hub 412 moves further until the second end 418 of the hub 412 abuts and locates within the seat 437 provided by the collar portions 434. At this position, the user will sense the increased resistance to movement of the hub 412 and will be aware that the final position has been reached.

In this final position, the hub 412 is disposed between the anchor portions 432 of the arms 414 and the fixing device 410 is in the expanded configuration. The hub 412 contacts the anchor portions 432 and resists or prevents radially inward movement of the anchor portions 432 of the arms 414. In other words, the hub 412 acts as a wedge between the anchor portions 432 holding them in a radially expanded position.

Although in the above embodiments the fixing device has been described as having four arms, it will be appreciated that the fixing device may have fewer or more than four arms. In particular, the fixing device will have two or more arms. The actuating part or hub may, therefore, have a corresponding number of side walls. For example, the fixing device may have three arms, and the hub may have a substantially triangular shape and three side walls. Furthermore, it will be understood that the cross-sectional shape of the hub and the number of side walls of the hub does not have to correspond to the number of arms of the fixing device. For example, the hub may be substantially cylindrical and independent of the number of arms of the fixing device. Importantly, the hub is sized and shaped so as to apply a force to at least the anchor portions of the arms to force them in a radially outwards direction and to retain or wedge them in the resultant expanded position.

In preferred embodiments of the fixing device the second surface of the stem of each of the arms has a convex curvature or arcuate form such that the radially outer surface of the fixing device is substantially cylindrical.

In the above embodiments the actuating part or hub 12, 112, 212, 312 was described as having an axial bore 26 for receiving a fastener 80. It will be appreciated that in other embodiments the hub may not include a bore and that the fastener 80 may self-tap into the hub or may engage with the hub in another way to permit subsequent movement of the fastener to cause axial movement of the hub. In some embodiments the fixing device may be adapted for use with a bolt. In these embodiments the actuating part may comprise an aperture or recess in which is housed a captive nut. The nut may be made of metal. The nut is retained in the recess of the actuating part such that the nut cannot rotate with respect to the actuating part. In use, when the bolt is inserted into the fixing device, the thread of the bolt engages with the thread of the nut. Operation of the fixing device is then as described above, with the inter-engaging threads of the bolt and nut causing the actuating part to move axially as the bolt is rotated.

It is envisaged, in some embodiments that the fixing device will form part of a rivet. In particular, the actuating part of the fixing device may form part of or be engaged with the mandrel head, the arms may form the rivet pin and a flange of the fixing device may form a head of the rivet. In these embodiments, a mandrel (the fastener) is connected to or extends from the actuating part through the guide passage and axial passage of the fixing device. When the rivet is used to secure two objects together, the fastener or mandrel is pulled to move the actuating part in an axial direction. The arms of the fixing device bend as described above and move into the expanded position. An end portion of the mandrel may then be detached flush with the rivet head or flange, leaving a part of the mandrel or fastener retained within the fixing device.

In some embodiments the dimensions of the guide passage and axial passage are such that there is no clearance between the inwardly facing surfaces of the anchor portions and/or collar portions and the fastener. In these embodiments, if the fastener is a threaded fastener, the fastener may self-tap or cut a helical groove in the anchor portions and/or collar portions as the fastener is engaged with the fixing device. This will cause radial expansion of these sections of the fixing device which will assist in retaining the fixing device in the hole.

It will also be appreciated that the axial passage and the guide passage may have any cross-sectional shape defined, at least in part, by the shape of the axial passage surfaces and/or guide surfaces of the arms. In some embodiments axial grooves may be formed in the first and/or second prominences such that the corresponding guide passage and/or axial passage has a generally fluted shape. The axial passage surfaces and/or guide surfaces may be provided by the first surface of the stem or a surface of a prominence. The axial passage surfaces and/or guide surfaces may be planar or flat surfaces such that the resulting axial passage and/or guide passage has a polygonal shape. The axial passage and/or guide passage may have a square cross-sectional shape when the fixing device has four arms.

As described above, the fixing devices of the present invention are preferably formed from a suitable polymeric material by injection moulding. By moulding the fixing devices in an initial splayed configuration, the fixing devices are easier to manufacture than some prior art fixing devices. Furthermore, the fixing devices can be designed to have an internal structure and shape in the insertion configuration that cooperates with the actuating part to expand the fixing device and retain the fixing device in a hole in a structure, such that the fixing device is capable of resisting relatively large tensile and shear forces. One particular advantage of the structure of the fixing device is that the plug section and fastener substantially fill the hole in the structure during use, which aids in resisting shear forces.

The invention claimed is:

1. A fixing device for holding a screw in a hole in a structure, said device having an axial passage to receive said screw, the device comprising:

- an actuating part configured to engage with said screw when said screw is rotated in use; and
- a plurality of arms extending from and hingedly connected to the actuating part, each arm comprising a distal portion, a connecting portion and an anchor portion, the connecting portion extending between the actuating part and the anchor portion and being hingedly connected to the anchor portion, and the anchor portion extending between the distal portion and the connecting portion and being hingedly connected to the distal portion, and wherein, in use, the screw extends through the axial passage and is rotated about its axis to engage with the actuating part, and after engagement of the screw with the actuating part, further rotation of the screw causes movement of the actuating part in a direction towards the distal portions to cause a part of each of the anchor portions to move in a radially outward direction with respect to the axial passage into an expanded configuration to anchor the fixing device in said hole, and in the expanded configuration at least a part of the actuating part is disposed between the anchor portions of the arms to resist or prevent radially inward movement of the anchor portions, characterised by:
- the arms being in an insertion configuration formed or formable by moving the arms from an initial configuration in which the arms are splayed to the insertion configuration in which the arms are substantially aligned so that the distal portions define the axial passage;
- wherein the actuating part comprises a contact surface and the anchor portion of each arm includes a prominence shaped to provide a bearing surface, said contact surface contacting the bearing surface to apply a force to the bearing surface, when the actuating part is moved in an axial direction towards the distal portions;
- said force has both an axial and a radial component and causes a proximal end of each of the anchor portions to start to move in a radially outwards direction as the actuating part is moved towards the distal portions by said further rotation of the screw; and
- wherein, in the expanded configuration, the actuating part is in contact with the distal portions to resist radially inward movement of the anchor portions.

2. A fixing device according to claim 1, in which, said axial movement of the actuating part created by said further rotation of the screw causes the contact surface of the actuating part to apply a force to the bearing surface of the arms and continued axial movement of the actuating part moves the actuating part into a position between anchor portions of the arms.

3. A fixing device according to claim 1 in which the screw is inserted into the axial passage of the fixing device and through a guide passage of a guide section, the screw is then rotated so that a thread of the screw proximate a tip enters a bore of the actuating part and engages with the actuating part, the screw is inserted further into the fixing device until an object is clamped between a head of the screw and an end surface of the fixing device defined by a flange.

4. A fixing device according to claim 1, in which, in the insertion configuration, a part of the actuating part is disposed between the connecting portions.

5. A fixing device as claimed in claim 1, in which the actuating part has a first end face, a second end face and a contact surface for applying a force to a part of one of the arms, the contact surface extending around a perimeter of the second end face and in the insertion configuration the contact surface is disposed between the connecting portions of the arms and in the expanded configuration the contact surface is in contact with a surface of each of the anchor portions or a surface of each of the distal portions.

6. A fixing device according to claim 5, in which the actuating part comprises a side face and the arms are hingedly connected to the actuating part at a distance from the second end face such that a majority of the side face is disposed between said hinged connection and the second end face, and wherein, to move the arms to the insertion configuration, the arms are rotated about said hinged connection in a direction away from the first end face of the actuating part.

7. A fixing device according to claim 1, in which the actuating part comprises a bore for receiving a part of said screw.

8. A fixing device according to claim 7, in which the bore is threaded.

9. A fixing device according to claim 1, wherein the anchor portions are held in the expanded configuration by direct contact between the actuating part and surfaces of the anchor portions.

10. A fixing device according to claim 1, in which, in the insertion configuration, adjacent arms are in contact with each other.

11. A fixing device according to claim 1, in which distal portions of adjacent arms are mechanically interlocked in the insertion configuration.

12. A fixing device according to claim 1, in which a flange member extends from the distal portion of each arm, the flange members forming a radially outwardly extending flange when the arms are in the insertion configuration.

13. A fixing device according to claim 1, in which the fixing device is a unitary object.

14. In combination, a fixing device according to claim 1 and a screw received through the axial passage and engaged with the actuating part.

15. A combination according to claim 14, in which an axis of the screw is parallel with an axis of the fixing device.

16. A fixing device according to claim 1 in which the bearing surface comprises a sloped bearing surface.

17. A fixing device for holding a screw in a hole in a structure, said device having an axial passage to receive said screw, the device comprising:

an actuating part configured to engage with said screw when said screw is rotated in use; and a plurality of arms extending from and hingedly connected to the actuating part, each arm comprising a distal portion, a connecting portion and an anchor portion, the connecting portion extending between the actuating part and the anchor portion and being hingedly connected to the anchor portion, and the anchor portion extending between the distal portion and the connecting portion and being hingedly connected to the distal portion, and wherein, in use, the screw extends through the axial passage and is rotated about its axis to engage with the actuating part, and after engagement of the screw with the actuating part, further rotation of the screw causes movement of the actuating part in a direction towards the distal portions to cause a part of each of the anchor portions to move in a radially outward direction with respect to the axial passage into an expanded configuration to anchor the fixing device in said hole, and in the expanded configuration at least a part of the actuating part is disposed between the anchor portions of the arms to resist or prevent radially inward movement of the anchor portions, characterized by:

the arms being in an insertion configuration formed or formable by moving the arms from an initial configuration in which the arms are splayed to the insertion configuration in which the arms are substantially aligned so that the distal portions define the axial passage, in which distal portions of adjacent arms are bonded or welded to each other in the insertion configuration;

wherein the actuating part comprises a contact surface and the anchor portion of each arm includes a prominence shaped to provide a bearing surface, said contact surface contacting the bearing surface to apply a force to the bearing surface, when the actuating part is moved in an axial direction towards the distal portions; and said force has both an axial and a radial component and causes a proximal end of each of the anchor portions to start to move in a radially outwards direction as the actuating part is moved towards the distal portions by said further rotation of the screw.

18. A fixing device for holding a screw in a hole in a structure, said device having an axial passage to receive said screw, the device comprising:

an actuating part configured to engage with said screw when said screw is rotated in use; and a plurality of arms extending from and hingedly connected to the actuating part, each arm comprising a distal portion, a connecting portion and an anchor portion, the connecting portion extending between the actuating part and the anchor portion and being hingedly connected to the anchor portion, and the anchor portion extending between the distal portion and the connecting portion and being hingedly connected to the distal portion, and wherein, in use, the screw extends through the axial passage and is rotated about its axis to engage with the actuating part, and after engagement of the screw with the actuating part, further rotation of the screw causes movement of the actuating part in a direction towards the distal portions to cause a part of each of the anchor portions to move in a radially outward direction with respect to the axial passage into an expanded configuration to anchor the fixing device in said hole, and in the expanded configuration at least a part of the actuating part is disposed between the anchor portions of the arms to resist or prevent radially inward movement of the anchor portions, characterized by:

the arms being in an insertion configuration formed or formable by moving the arms from an initial configuration in which the arms are splayed to the insertion configuration in which the arms are substantially aligned so that the distal portions define the axial passage, in which distal portions of adjacent arms are bonded or welded to each other in the insertion configuration;

wherein the actuating part comprises a contact surface and the anchor portion of each arm includes a prominence shaped to provide a bearing surface, said contact surface contacting the bearing surface to apply a force to the bearing surface, when the actuating part is moved in an axial direction towards the distal portions; and said force has both an axial and a radial component and causes a proximal end of each of the anchor portions to start to move in a radially outwards direction as the actuating part is moved towards the distal portions by said further rotation of the screw;

in which the fixing device is made of a rigid or semi-rigid polymeric material and in which:

each arm is hingedly connected to the actuating part by a live hinge;

each anchor portion is hingedly connected to the respective connecting portion by a live hinge; and each distal portion is hingedly connected to the respective anchor portion by a live hinge.

* * * * *